(12) United States Patent
Kuai

(10) Patent No.: US 12,113,679 B2
(45) Date of Patent: Oct. 8, 2024

(54) TRAINING METHOD FOR APPLICATION MOS MODEL, DEVICE, AND SYSTEM

(71) Applicant: HUAWEI TECHNOLOGIES CO., LTD., Shenzhen (CN)

(72) Inventor: Shaofeng Kuai, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 17/581,935

(22) Filed: Jan. 23, 2022

(65) Prior Publication Data

US 2022/0150130 A1 May 12, 2022

Related U.S. Application Data

(63) Continuation of application No. PCT/CN2020/080958, filed on Mar. 24, 2020.

(30) Foreign Application Priority Data

Jul. 23, 2019 (CN) .......................... 201910668701.5

(51) Int. Cl.
*H04L 41/14* (2022.01)
*H04L 41/147* (2022.01)
(Continued)

(52) U.S. Cl.
CPC .......... *H04L 41/145* (2013.01); *H04L 41/147* (2013.01); *H04L 41/5009* (2013.01); *H04W 24/08* (2013.01)

(58) Field of Classification Search
None
See application file for complete search history.

(56) References Cited

U.S. PATENT DOCUMENTS

2018/0262924 A1 9/2018 Dao et al.
2018/0367428 A1 12/2018 Di Pietro et al.
(Continued)

FOREIGN PATENT DOCUMENTS

CN 104221411 A 12/2014
CN 104782168 A 7/2015
(Continued)

OTHER PUBLICATIONS

"RAN4 AH-1801 Meeting report",3GPP TSG-RAN WG4 Meeting #86 R4-1801402,Athens, Greece, Feb. 26-Mar. 2, 2018,total 479 pages.
(Continued)

*Primary Examiner* — Alex Skripnikov
*Assistant Examiner* — Angelie T Ngo
(74) *Attorney, Agent, or Firm* — Rimon PC

(57) ABSTRACT

Embodiments of this application provide a training method for an application MOS model, and related device and system. A central network data analytics function (C-NWDAF) entity sends a first subscription request to an edge network data analytics function (E-NWDAF) entity, where the first subscription request is used to subscribe to a quality of service MOS level of a target service and a corresponding first network performance indicator. The first network performance indicator is a network performance indicator of a transmission network that carries the target service. The C-NWDAF entity receives the quality of service MOS level and the first network performance indicator from the E-NWDAF entity, and establishes a MOS model of the target service based on the received quality of service MOS level and the first network performance indicator.

13 Claims, 10 Drawing Sheets

(51) Int. Cl.
*H04L 41/5009* (2022.01)
*H04W 24/08* (2009.01)

(56) References Cited

U.S. PATENT DOCUMENTS

| | | | |
|---|---|---|---|
| 2019/0222489 A1 | 7/2019 | Shan | |
| 2020/0358670 A1* | 11/2020 | Lee | .............. H04L 41/5067 |
| 2021/0014141 A1* | 1/2021 | Patil | .............. H04W 76/25 |
| 2022/0263724 A1* | 8/2022 | Lair | .............. H04L 41/142 |

FOREIGN PATENT DOCUMENTS

| | | |
|---|---|---|
| CN | 109561300 A | 4/2019 |
| CN | 109600759 A | 4/2019 |
| WO | 2018161850 A1 | 9/2018 |

OTHER PUBLICATIONS

3GPP TS 23.228 V16.1.0 (Jun. 2019)3rd Generation Partnership Project;Technical Specification Group Services and System Aspects;IP Multimedia Subsystem (IMS);Stage 2(Release 16),total 345 pages.
"RAN4 AH-1801 Meeting report",3GPP TSG-RAN WG4 Meeting #86 R4-18xxxxx,Athens, Greece, Feb. 26-Mar. 2, 2018,total 478 pages.
3GPP TS 23.288 V16.0.0:"3rd Generation Partnership Project;Technical Specification Group Services and System Aspects;Architecture enhancements for 5G System (5GS) to support network data analytics services(Release 16)",Jun. 2019,total 52 pages.
3GPP TS 23.501 V16.1.0:"3rd Generation Partnership Project;Technical Specification Group Services and System Aspects;System Architecture for the 5G System;Stage 2(Release 16)",Jun. 2019,total 367 pages.
3GPP TR 23.791 V16.2.0 (Jun. 2019);3rd Generation Partnership Project;Technical Specification Group Services and System Aspects;Study of Enablers for Network Automation for 5G(Release 16),Total 124 Pages.
3GPP TR 23.791 V1.1.0 (Oct. 2018), 3rd Generation Partnership Project; Technical Specification Group Services and System Aspects; Study of Enablers for Network Automation for 5G(Release 16), total 115 pages.
Huawei et al.,"Discussion about NWDAF interactions with OAM" SA WG2 Meeting #128 S2-186666, Jul. 2-6, 2018, total 12 pages.
Nokia et al.,"Optionality of data to be collected by NWDAF", SA WG2 Meeting #134 S2-1907600, Jun. 24-28, 2019, Sapporo, Japan, total 17 pages.
5GAA TR-200055,SG Automotive Association; Working Group System Architecture and Solution Development;SGS Enhancements for Providing Predictive QoS in C-V2X, Oct. 1, 2018, XP009518889, total 60 pages.

\* cited by examiner

TRAINING METHOD FOR APPLICATION MOS MODEL, DEVICE, AND SYSTEM

CROSS-REFERENCE TO RELATED APPLICATIONS

This application is a continuation of International Patent Application No. PCT/CN2020/080958 filed on Mar. 24, 2020, which claims priority to Chinese Patent Application No. 201910668701.5 filed on Jul. 23, 2019. The disclosures of the aforementioned applications are hereby incorporated by reference in their entireties.

TECHNICAL FIELD

This application relates to the field of communication technologies, and in particular, to a training method for an application mean opinion score (MOS) model, and related device and system.

BACKGROUND

FIG. 1 shows positioning of a network data analytics function (NWDAF) in the 3rd generation partnership project (3GPP) 23.791. Specifically, the NWDAF may subscribe to basic data from 5th generation core (5GC) network functions (NFs), application functions (AFs), and an operation administration and maintenance (OAM) system of a carrier network, analyzes the subscribed basic data based on different scenarios, and then feeds back an analysis result to the NFs and the AFs for subsequent processing.

For a service experience assurance scenario, how the NWDAF subscribes to the data from the NF and the AF and establishes a MOS model of a specified service is defined in the observed service experience related network data analytics of the 3GPP 23.288 6.4. Specifically, an NWDAF entity subscribes to a quality of service MOS level of the specified service from an AF entity, and the NWDAF entity subscribes to, from a 5GC NFs entity, a network performance indicator of a transmission network that carries the current service. Further, the NWDAF entity establishes the MOS model (namely, a mathematical relationship between the quality of service MOS level and the network performance indicator of the transmission network) of the specified service based on the quality of service MOS level subscribed from the AF entity and the network performance indicator of the transmission network subscribed from the 5GC NFs entity.

However, in the foregoing method for establishing a MOS model of a service, the network performance indicator of the transmission network and the quality of service MOS level need to be respectively subscribed from the 5GC NFs entity and the AF entity. Therefore, measurement synchronization must rely on the capabilities and cooperation of the 5GC NFs entity and the AF entity. This is difficult to implement in a live network.

SUMMARY

Embodiments of this application provide a training method for an application MOS model to resolve a problem that the existing training methods for a MOS model of a service rely on the capability of and cooperation from an AF entity, thereby difficult to implement in a live network.

To achieve the foregoing objective, the following technical solutions are used in the embodiments of this application.

According to a first aspect, a training method for an application mean opinion score MOS model is provided. The method includes: A central network data analytics function (central NWDAF, C-NWDAF) entity sends a first subscription request to an edge network data analytics function (edge NWDAF, E-NWDAF) entity, where the first subscription request is used to request to subscribe to a quality of service MOS level of a target service and a corresponding first network performance indicator. The first network performance indicator is a network performance indicator of a transmission network that carries the target service. The C-NWDAF entity receives the quality of service MOS level and the first network performance indicator from the E-NWDAF entity; and the C-NWDAF entity establishes a MOS model of the target service based on the quality of service MOS level and the first network performance indicator. In an embodiment of this application, the quality of service MOS level is a comprehensive score that is of a current service and that is obtained by analyzing a measurement result of a key quality of service indicator by using an experience model in a service process, where the key indicator in the service process is measured by using means such as an instrument or a tool. The quality of service MOS level may also be referred to as a service experience quality score. For example, a 5-point scale may be used, and a quality of service evaluation score can be 1, 2, 3, 4, or 5. In addition, in some embodiments of this application, establishing the MOS model of the target service is establishing a mathematical relationship between the quality of service MOS level of the target service and a network performance indicator. Based on the training method for an application MOS model provided in this application, a carrier deploys distributed NWDAF entities including the C-NWDAF entity and the E-NWDAF entity, the C-NWDAF entity may subscribe to the quality of service MOS level of the target service and the corresponding first network performance indicator from the E-NWDAF entity, and the E-NWDAF entity obtains the quality of service MOS level of the target service and the corresponding first network performance indicator through synchronous measurement. In other words, the E-NWDAF entity obtains the quality of service MOS level of the target service and the corresponding first network performance indicator inside the carrier. Therefore, the implementation becomes easier, and the measurement results are more accurate.

In a possible design, the quality of service MOS level is determined based on service experience data of the target service. For example, when the target service is a video service, the service experience data includes one or more of the following parameters: an initial buffering delay, playback buffer duration, a bit rate, a service rate, a frame rate, smoothness, and a definition of the video service, and a resolution of a terminal device. The bit rate of the video service in some embodiments of this application is a quantity of data bits that are transferred per unit of time during data transmission, and a unit is generally kilobits per second (kbps). The frame rate of the video service is a measure used to measure a quantity of displayed frames, and a measurement unit is displayed frames per second (FPS) or hertz (Hz). The resolution of the terminal device includes display resolution and/or image resolution. The display resolution may also be referred to as screen resolution, and is a quantity of pixels that can be displayed on a display. The image resolution is a quantity of pixels per inch.

In a possible design, the first network performance indicator includes one or more of the following parameters: a quantity of lost uplink packets, an uplink packet loss rate, a quantity of lost downlink packets, a downlink packet loss rate, a round-trip time (RTT), a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the terminal device and an access network device; a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the access network device and a user plane entity; and a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the user plane entity and an application function entity. In some embodiments of this application, a bit error means that an error occurs in some bits that have been received, judged, and regenerated in a digital data stream, and causes damage to the quality of transmitted information. The bit error may be understood as an error that occurs in a data packet in a transmission process. Out-of-order means that when a data packet is too large, the data packet is split into a plurality of data packets that satisfies transmission requirements, where each data packet has a corresponding sequence number for a peer end to reassemble; however, due to different intermediate routes or poor network quality, a later sent data packet may first arrive at the peer end, thus causing out-of-order data packets. A high out-of-order packet rate also leads to poor communication quality. Jitter refers to a variation degree of the delay of packet data packets. If a network is congested, a queuing delay affects an end-to-end delay and causes different delays of packets transmitted through a same connection. Jitter is used to describe the variation degree of the delay. In addition, user plane entity in some embodiments of this application is an entity configured to forward a user data packet. In a 5th generation (5G) communication system, a user plane entity may be a user plane function (UPF) network element. In a future communication system, such as sixth generation (6G) network, a user plane entity may still be a UPF network element or have another name.

This is not limited in this application. An application function entity in this application is configured to provide an application layer service function for the terminal device. In the $5^{th}$ generation (5G) communication system, the application function entity may be an AF network element. In a future communication system such as the $6^{th}$ generation (6G) communication, an application function entity may still be an AF network element or have another name. This is not limited in this application.

In a possible design, the method further includes: The C-NWDAF entity obtains a second network performance indicator corresponding to the MOS level, where the second network performance indicator is a performance indicator of a radio network that carries the target service. That the C-NWDAF entity establishes a MOS model of the target service based on the quality of service MOS level and the first network performance indicator includes: The C-NWDAF entity excludes a sample whose quality of service MOS is poor due to an exception of the terminal device and a sample whose quality of service MOS is poor due to an exception of the application function entity based on the second network performance indicator, the quality of service MOS level, and the first network performance indicator, and establishes the MOS model of the target service. In some embodiments of this application, the samples whose quality of service MOS is poor are samples whose MOS score is relatively low due to the exception of the terminal device and the exception of the application function entity. Because the first network performance indicator, the performance indicator of the radio network that carries the target service, the sample whose quality of service MOS is poor due to the exception of the terminal device, and the sample whose quality of service MOS is poor due to the exception of the application function entity are considered, the MOS model that is of the target service and that is established by using the training method for an application MOS model provided in this embodiment of this application is more accurate and comprehensive.

In a possible design, the method further includes: The C-NWDAF entity obtains a first load of a first network function entity corresponding to the MOS level, where the first network function entity is a network data provider function entity. That the C-NWDAF entity establishes a MOS model of the target service based on the quality of service MOS level and the first network performance indicator includes: The C-NWDAF entity excludes a sample whose quality of service MOS is poor due to an exception of the terminal device and a sample whose quality of service MOS is poor due to an exception of the application function entity based on the first load of the first network function entity, the quality of service MOS level, and the first network performance indicator, and establishes the MOS model of the target service. Because the first network performance indicator, the first load of the first network function entity corresponding to the MOS level, the sample whose quality of service MOS is poor due to the exception of the terminal device, and the sample whose quality of service MOS is poor due to the exception of the application function entity are considered, the MOS model that is of the target service and that is established by using the training method for an application MOS model provided in this embodiment of this application is more accurate and comprehensive.

In a possible design, the method further includes: The C-NWDAF entity obtains a second network performance indicator corresponding to the MOS level and a first load of a first network function entity corresponding to the MOS level, where the second network performance indicator is a performance indicator of a radio network that carries the target service, and the first network function entity is a network data provider function entity. That the C-NWDAF entity establishes a MOS model of the target service based on the quality of service MOS level and the first network performance indicator includes: The C-NWDAF entity excludes a sample whose quality of service MOS is poor due to an exception of the terminal device and a sample whose quality of service MOS is poor due to an exception of the application function entity based on the second network performance indicator, the first load of the first network function entity, the quality of service MOS level, and the first network performance indicator, and establishes the MOS model of the target service. Because the first network performance indicator, the performance indicator of the radio network that carries the target service, the first load of the first network function entity corresponding to the MOS level, the sample whose quality of service MOS is poor due to the exception of the terminal device, and the sample whose quality of service MOS is poor due to the exception of the application function entity are considered, the MOS model of the target service established by using the training method for an application MOS model provided in this embodiment of this application is more accurate and comprehensive.

In a possible design, that the C-NWDAF entity obtains a first load of a first network function entity corresponding to the MOS level includes: The C-NWDAF entity sends a second subscription request to a network repository function entity, where the second subscription request is used to request to subscribe to the first load of the first network function entity; and the C-NWDAF entity receives the first load of the first network function entity from the network repository function entity. The network repository function entity in this embodiment of this application is configured to: store description information of a network function entity (for example, the first network function entity) and a service provided by the network function entity, and support service discovery, network element or entity discovery, and the like. In the 5th generation 5G communication system, the network repository function entity may be a network repository function (NRF) entity. In the future communication such as the 6th generation 6G communication, the network repository function entity may still be an NRF entity or have another name. This is not limited in this embodiment of this application.

Based on this solution, the C-NWDAF entity may obtain the first load of the first network function entity corresponding to the MOS level.

In a possible design, that the C-NWDAF entity obtains a second network performance indicator corresponding to the MOS level includes: The C-NWDAF entity sends a third subscription request to an operation administration and maintenance OAM entity of a carrier network, where the third subscription request is used to request to subscribe to the second network performance indicator; and the C-NWDAF entity receives the second network performance indicator from the OAM entity. Based on this solution, the C-NWDAF entity obtains the second network performance indicator corresponding to the MOS level.

In a possible design, the first load of the first network function entity includes one or more of the following parameters: a quantity of sessions of the first network function entity, a quantity of users of the first network function entity, and resource usage of the first network function entity. In other words, the MOS model of the target service in an embodiment of this application is further related to one or more of the quantity of sessions of the first network function entity, the quantity of users of the first network function entity, and the resource usage of the first network function entity. Therefore, the MOS model of the target service is more complete.

In a possible design, the second network performance indicator includes one or more of the following parameters: a quantity of sessions, a quantity of radio resource control (RRC) connected users, a congestion status, and resource usage of the access network device, a radio measurement indicator of the terminal device, and location information of the terminal device. In other words, the MOS model of the target service in an embodiment of this application is further related to one or more of the quantity of sessions, the quantity of RRC connected users, the congestion status, and the resource usage of the access network device, the radio measurement indicator of the terminal device, and the location information of the terminal device. Therefore, the MOS model of the target service is more complete.

In a possible design, before the C-NWDAF entity sends the first subscription request to the E-NWDAF entity, the method further includes: The C-NWDAF entity receives a fourth subscription request from a second network function entity, where the fourth subscription request is used to request to subscribe to the MOS model of the target service, and the second network function entity is a consumer function entity. After the C-NWDAF entity establishes the MOS model of the target service, the method further includes: The C-NWDAF entity sends the MOS model of the target service to the second network function entity. In other words, in the training method for an application MOS model provided in an embodiment of this application, the C-NWDAF entity may send the first subscription request message to the E-NWDAF entity based on triggering of the consumer function entity. The consumer function entity in an embodiment of this application is a requester that initiates a data analysis request or subscription to the C-NWDAF entity or the NWDAF entity.

In a possible design, the method further includes: The C-NWDAF entity receives a fifth subscription request from a policy control entity, where the fifth subscription request is used to request to provide service experience assurance for the target service of the target terminal device, and a quality of service MOS level requirement for the service experience assurance is a first quality of service MOS level; the C-NWDAF entity sends a sixth subscription request to the E-NWDAF entity, where the sixth subscription request is used to request to subscribe to a trigger event for using the target service by the target terminal device, a second quality of service MOS level of the target service, and a corresponding first network performance indicator; after the trigger event is triggered, the C-NWDAF entity receives the second quality of service MOS level and the corresponding first network performance indicator from the E-NWDAF entity; when the second quality of service MOS level is different from the first quality of service MOS level, the C-NWDAF entity matches the first network performance indicator corresponding to the second quality of service MOS level with a first network performance indicator corresponding to the first quality of service MOS level in the MOS model of the target service, to obtain a network analysis result; and the C-NWDAF entity sends the network analysis result to the policy control entity, where the network analysis result is used for network optimization. In other words, based on the MOS model of the target service provided in this application and with reference to the current service experience quality of the terminal device, real-time service experience assurance can be provided for a user, and the service experience perception of the user can be further improved.

In a possible design, the method further includes: The C-NWDAF entity receives a fifth subscription request from a policy control entity, where the fifth subscription request is used to request to provide service experience assurance for the target service of the target terminal device, and a quality of service MOS level requirement for the service experience assurance is a first quality of service MOS level; the C-NWDAF entity determines, based on a movement track of the target terminal device, that the target terminal device is to move from a service range of a first access network device to a service range of a second access network device; the C-NWDAF entity sends a sixth subscription request to the E-NWDAF entity, where the sixth subscription request is used to request to subscribe to a trigger event for using the target service by a target terminal device and a first network performance indicator associated with the second access network device; after the trigger event is triggered, the C-NWDAF entity receives the first network performance indicator associated with the second access network device from the E-NWDAF entity; the C-NWDAF entity matches the first network performance indicator associated with the second access network device with the MOS model of the target service, to determine a third quality of service MOS level of the target service corresponding to the first network performance indicator associated with the second access network device; when the third quality of service MOS level is different from the first quality of service MOS level, the C-NWDAF entity matches the first network performance indicator corresponding to the third quality of service MOS level with a first network performance indicator corresponding to the first quality of service MOS level in the MOS model of the target service, to obtain a network prediction result; and the C-NWDAF entity sends the network prediction result to the policy control entity, where the network prediction result is used for network optimization. In other words, based on the MOS model of the target service provided in this application and with reference to current service experience quality of the terminal device, real-time service experience assurance can be provided for a user, and the service experience perception of the user can be further improved.

According to a second aspect, a training method for an application mean opinion score MOS model is provided. The method includes: An edge network data analytics function E-NWDAF entity receives a first subscription request from a central network data analytics function C-NWDAF entity, where the first subscription request is used to request to subscribe to a quality of service MOS level of a target service and a corresponding first network performance indicator, and the first network performance indicator is a network performance indicator of a transmission network that carries the target service; the E-NWDAF entity obtains the quality of service MOS level and the first network performance indicator; and the E-NWDAF entity sends the quality of service MOS level and the first network performance indicator to the C-NWDAF entity. Based on the training method for an application MOS model provided in this application, a carrier deploys distributed NWDAF entities including the C-NWDAF entity and the E-NWDAF entity, the C-NWDAF entity may subscribe to the quality of service MOS level of the target service and the corresponding first network performance indicator from the E-NWDAF entity, and the E-NWDAF entity obtains the quality of service MOS level of the target service and the corresponding first network performance indicator through synchronous measurement. In other words, the E-NWDAF entity obtains the quality of service MOS level of the target service and the corresponding first network performance indicator inside the carrier. Therefore, implementation becomes easier, and measurement result becomes more accurate.

In a possible design, that the E-NWDAF entity obtains the quality of service MOS level includes: The E-NWDAF entity obtains service experience data of the target service; and the E-NWDAF entity determines the quality of service MOS level based on the service experience data of the target service. Based on this solution, the E-NWDAF entity may obtain the quality of service MOS level.

For example, when the target service is a video service, the service experience data includes one or more of the following parameters: an initial buffering delay, playback buffer duration, a bit rate, a service rate, a frame rate, smoothness, and a definition of the video service, and a resolution of a terminal device.

In a possible design, the first network performance indicator includes one or more of the following parameters: a quantity of lost uplink packets, an uplink packet loss rate, a quantity of lost downlink packets, a downlink packet loss rate, a round-trip time RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the terminal device and an access network device; a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the access network device and a user plane entity; and a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the user plane entity and an application function entity.

According to a third aspect, a communication apparatus is provided, to implement the foregoing methods. The communication apparatus may be the C-NWDAF entity in the first aspect, or an apparatus including the C-NWDAF entity.

Alternatively, the communication apparatus may be the E-NWDAF entity in the first aspect, or an apparatus including the E-NWDAF entity. The communication apparatus includes a corresponding module, unit, or means (means) for implementing the foregoing methods. The module, unit, or means may be implemented by using hardware or software, or implemented by using hardware by executing corresponding software. The hardware or software includes one or more modules or units corresponding to the foregoing functions.

According to a fourth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the C-NWDAF entity in the first aspect, or an apparatus including the C-NWDAF entity. Alternatively, the communication apparatus may be the E-NWDAF entity in the first aspect, or an apparatus including the E-NWDAF entity.

According to a fifth aspect, a communication apparatus is provided. The communication apparatus includes a processor. The processor is configured to: after being coupled to a memory and reading instructions in the memory, perform the method according to any one of the foregoing aspects according to the instructions. The communication apparatus may be the C-NWDAF entity in the first aspect, or an apparatus including the C-NWDAF entity. Alternatively, the communication apparatus may be the E-NWDAF entity in the first aspect, or an apparatus including the E-NWDAF entity.

According to a sixth aspect, a computer-readable storage medium is provided. The computer-readable storage medium stores instructions. When the instructions are run on a computer, the computer is enabled to perform the method according to any one of the foregoing aspects.

According to a seventh aspect, a computer program product including instructions is provided. When the computer program product runs on a computer, the computer is enabled to perform the method according to any one of the foregoing aspects.

According to an eighth aspect, a communication apparatus (for example, the communication apparatus may be a chip or a chip system) is provided. The communication apparatus includes a processor configured to implement the function in any one of the foregoing aspects. In a possible design, the communication apparatus further includes a memory, and the memory is configured to store necessary program instructions and data. When the communication apparatus is a chip system, the chip system may include a chip, or include a chip and other discrete devices.

For technical effects brought by any one of the designs of the third aspect to the eighth aspect, refer to the technical effects brought by different designs of the first aspect or the second aspect. Details are not described herein again.

According to a ninth aspect, a communication system is provided. The communication system includes a central network data analytics function C-NWDAF entity and an edge network data analytics function E-NWDAF entity. The C-NWDAF entity is configured to send a first subscription request to the E-NWDAF entity, where the first subscription request is used to request to subscribe to a quality of service mean opinion score MOS level of a target service and a corresponding first network performance indicator, and the first network performance indicator is a network performance indicator of a transmission network that carries the target service. The E-NWDAF entity is configured to: after receiving the first subscription request from the C-NWDAF entity and obtaining the quality of service MOS level and the first network performance indicator, send the quality of service MOS level and the first network performance indicator to the C-NWDAF entity. The C-NWDAF entity is configured to: receive the quality of service MOS level and the first network performance indicator from the E-NWDAF entity, and establish a MOS model of the target service based on the quality of service MOS level and the first network performance indicator. For a technical effect of the ninth aspect, refer to the first aspect or the second aspect. Details are not described herein again.

In a possible design, the C-NWDAF entity is further configured to perform the training method for an application MOS model according to the first aspect.

In a possible design, the E-NWDAF entity is further configured to perform the training method for an application MOS model according to the second aspect.

DESCRIPTION OF EMBODIMENTS

For ease of understanding of technical solutions in embodiments of this application, the following first briefly describes technologies related to this application.

With the advent of a 5G network, architectures of mobile networks and services carried by the mobile networks have changed greatly. The emergence of new application scenarios such as an internet of vehicles, cloud augmented reality (AR)/virtual reality (VR), high-definition live broadcast, and industrial control imposes higher end-to-end quality of service (QoS) requirements on the 5G network. For example, an enhanced mobile broadband (eMBB) service requires a large capacity, a high speed, and dynamic bandwidth allocation, so that gigabyte videos can be uploaded or downloaded at a high speed, and bandwidth can be dynamically allocated to services such as an ultra high-definition video and VR/AR. An ultra-reliable low-latency (ultra-reliable low-latency communication) service requires high reliability, high availability, and a low latency, to support reliable running of mission-critical services such as automatic manufacturing and remote surgery, and satisfy low-latency requirements of delay-critical services such as autonomous driving and unmanned aerial vehicle remote control. A massive machine type communication (mMTC) service requires a large capacity, a high speed, and dynamic bandwidth allocation, so that a connection of one billion devices can be provided for internet of things (IoT) services such as a smart city, and a connection density can reach millions of devices per square kilometer.

Figure 1:
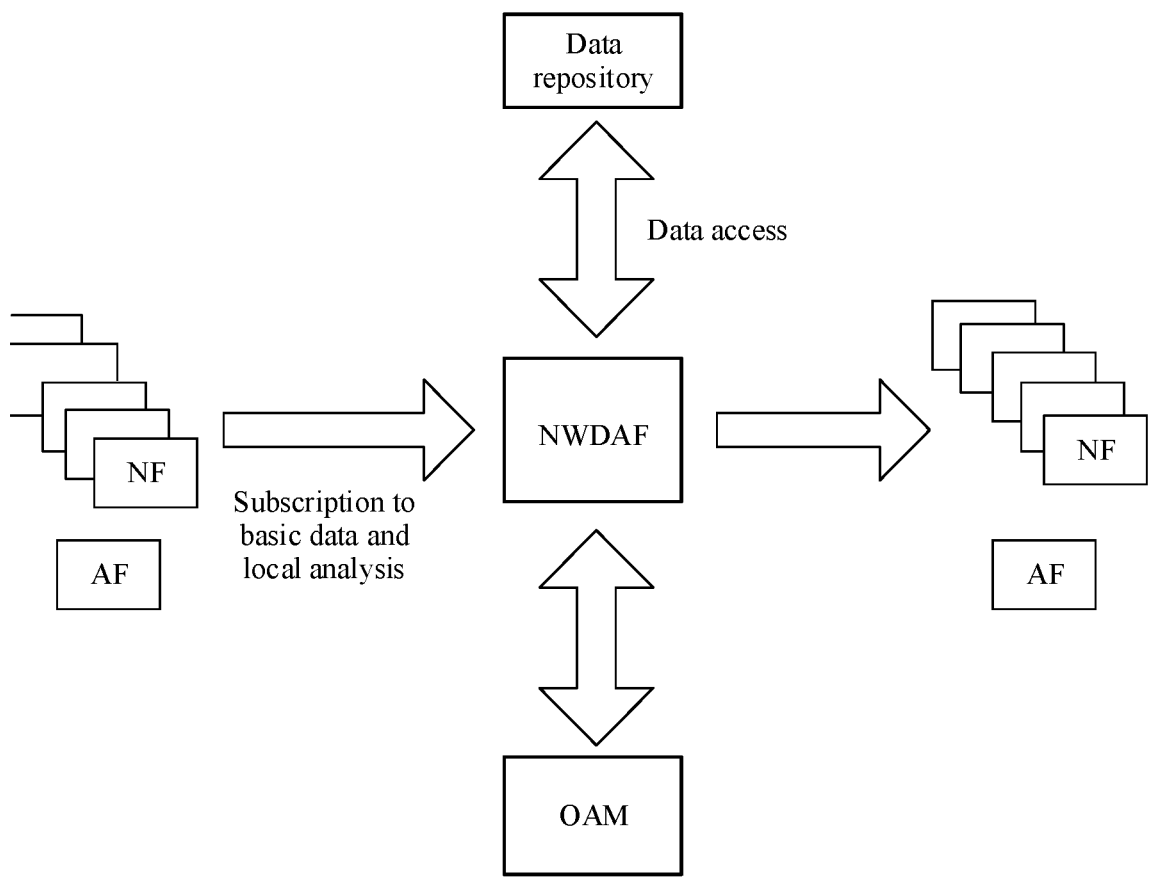
FIG. 1 is a schematic diagram of positioning of an NWDAF according to the 3GPP 23.791 in a conventional technology.
Figure 2:
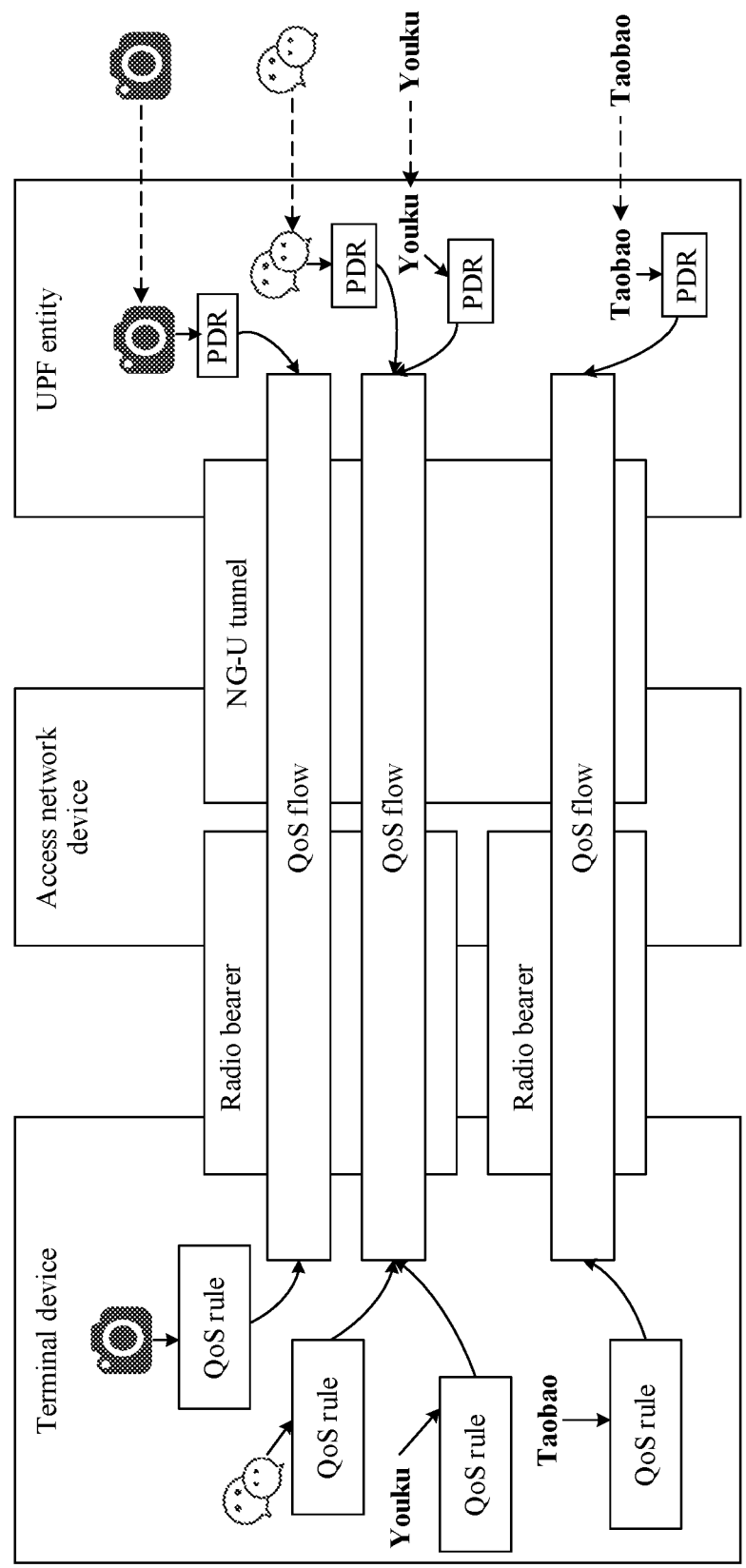
FIG. 2 is a schematic diagram of on-demand resource customization in a conventional technology.

QoS is designed to support on-demand customization and provide network services with differentiated quality for a service when resources are limited. As shown in FIG. 2, resources (for example, an air interface bearer resource between a terminal device and an access network device or a next generation network user plane (NG-U) tunnel between the access network device and a UPF entity) in a network are shared by all users and services. However, different QoS rules may be allocated to different services (such as camera, WeChat, Youku, or Taobao) on demand to implement differentiated quality of service at the lowest cost.

The QoS generally has two meanings. One is a level of quality of service, namely, a specific indicator (parameter) that represents the QoS. The other one is how to guarantee these indicators, namely, a QoS implementation mechanism. A standard 5G QoS specification (namely, the specific indicator (parameter) that represents the QoS) is defined in the section 5.7.4 of the 3GPP 23.501. The specification includes a 5G QoS identifier (5QI) value, a corresponding resource type (resource type), a default priority level, a packet delay budget (PDB), a packet error rate (PER), a default maximum data burst volume (MDBV), a default averaging window (DAV), and an example service, as shown in Table 1:

example, the access network device or a core network device) in the network provides assurance for data transmission based on a QoS profile (QoS profile), but whether end-to-end service experience quality can be ensured is unknown. Therefore, an NWDAF entity is introduced in the 3GPP 23.791 and 23.228. The NWDAF entity subscribes to a network performance indicator (a packet loss rate, an RTT, and a bit error rate) of a transmission network from a 5GC NFs entity and subscribes to a quality of service MOS level from an AF entity, so that a MOS model of a specified service is obtained through inference. The MOS model is used to help a carrier to provide, based on the QoS configuration profile, differentiated quality of service assurance for a terminal user, a third-party application (over the top, OTT) vendor carried on a carrier network, and an industry.

The following describes the technical solutions in the embodiments of this application with reference to accompanying drawings. It should be noted that the network architectures and the service scenarios described in the embodiments of this application are intended to help describing the technical solutions more clearly, and do not constitute a limitation on the technical solutions provided in the embodiments of this application. A person of ordinary skill in the art may understand that with evolution of the network architecture and emergence of a new service scenario, the technical solutions provided in the embodiments of this application are also applicable to similar technical problems.

Figure 3:
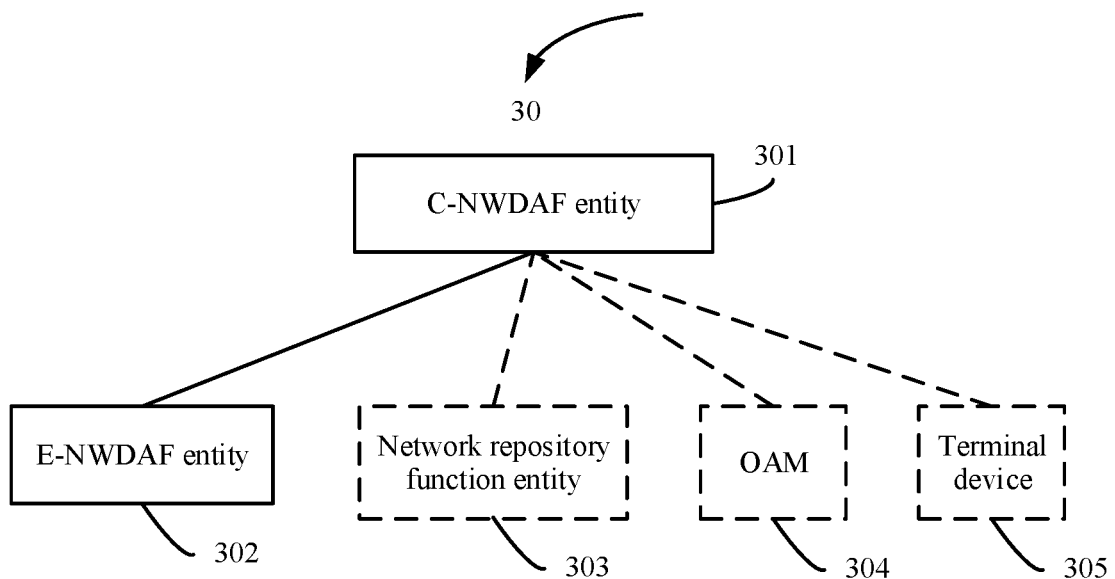
FIG. 3 is a schematic diagram of an architecture of a communication system according to an embodiment of this application.

FIG. 3 shows a communication system 30 according to an embodiment of this application. The communication system 30 includes a C-NWDAF entity 301 and an E-NWDAF entity 302. The C-NWDAF entity 301 and the E-NWDAF entity 302 are distributed structures of an NWDAF entity.

The E-NWDAF entity 302 may be deployed on a 5GC NFs side, an access network device side, or inside a terminal device. For example, the E-NWDAF entity 302 may be embedded in the terminal device through a software development kit (software development kit, SDK), may be co-deployed with a UPF entity through network function virtualization (NFV) by using a software plug-in, or may be deployed around an access network device, the UPF entity, or the like through universal server software. In an embodiment of this application, the E-NWDAF entity 302 is mainly configured to: collect a quality of service MOS level of a target service and a corresponding first network performance

TABLE 1

| 5QI value | Resource type | Default priority level | PDB | PER | Default MDBV | Example Service |
|---|---|---|---|---|---|---|
| 10 | Delay-critical | 11 | 5 ms | 10-5 | 160 B | Remote control (remote control) |
| 11 | guaranteed bit rate (guaranteed bit rate, | 12 | 10 ms | 10-5 | 320 B | Intelligent transport system (intelligent transport system) |
| 12 | | 13 | 10 ms | 10-5 | 640 B | |
| 16 | GBR) | 18 | 10 ms | 10-4 | 255 B | Discrete automation (discrete automation) |
| 17 | | 19 | 10 ms | 10-4 | 1358 B | Discrete automation |
| 1 | GBR | 20 | 100 ms | 10-2 | N/A | Conversation voice (conversation voice) |
| 2 | | 40 | 150 ms | 10-3 | N/A | Conversation video (conversation video) |
| 3 | | 30 | 50 ms | 10-3 | N/A | Real time gaming (real time gaming) . . . |

The 5QI in Table 1 is defined as an end-to-end network quality of service level. Each transmission node (for indicator, and provide the quality of service MOS level of the target service and the corresponding first network performance indicator for the C-NWDAF entity 301, where the first network performance indicator is a network performance indicator of a transmission network that carries the target service.

The C-NWDAF entity 301 is a central node, and is mainly configured to: obtain the quality of service MOS level of the target service and the corresponding first network performance indicator from the E-NWDAF entity 302, and establish a MOS model of the target service based on the quality of service MOS level of the target service and the corresponding first network performance indicator. Optionally, as shown in FIG. 3, the communication system may further include one or more of a network repository function entity 303, an OAM entity 304, or a terminal device 305. The C-NWDAF entity 301 may further interact with one or more of the network repository function entity 303, the terminal device 305, or the OAM entity 304 to collect data, and complete final MOS inference and analysis based on the quality of service MOS level of the target service and the corresponding first network performance indicator.

It should be noted that the entity in this embodiment of this application may also be referred to as a network element.

For a training method for an application MOS model based on the communication system, refer to subsequent method embodiments. Details are not described herein again.

Optionally, the terminal device in some embodiments of this application may be a device configured to implement a wireless communication function, for example, a terminal, or a chip that may be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving (self driving), a wireless terminal in telemedicine, a wireless terminal in a smart grid, a wireless terminal in transportation safety, a wireless terminal in a smart city, a wireless terminal in a smart home, or the like. The terminal may be mobile or fixed.

Optionally, the access network device in this embodiment of this application is a device that accesses a core network. For example, the access network device may be a base station, a broadband network gateway (BNG), an aggregation switch, or a non-3GPP access device. There may be base stations in various forms, for example, a macro base station, a micro base station (also referred to as a small cell), a relay station, and an access point.

Optionally, a related function of the C-NWDAF entity or the E-NWDAF entity in some embodiments of this application may be implemented by one device, may be jointly implemented by a plurality of devices, or may be implemented by one or more function modules in a device. This is not specifically limited. It may be understood that the foregoing function may be a network element in a hardware device, may be a software function running on dedicated hardware, a combination of hardware and software, or a virtualization function instantiated on a platform (for example, a cloud platform).

Figure 4:
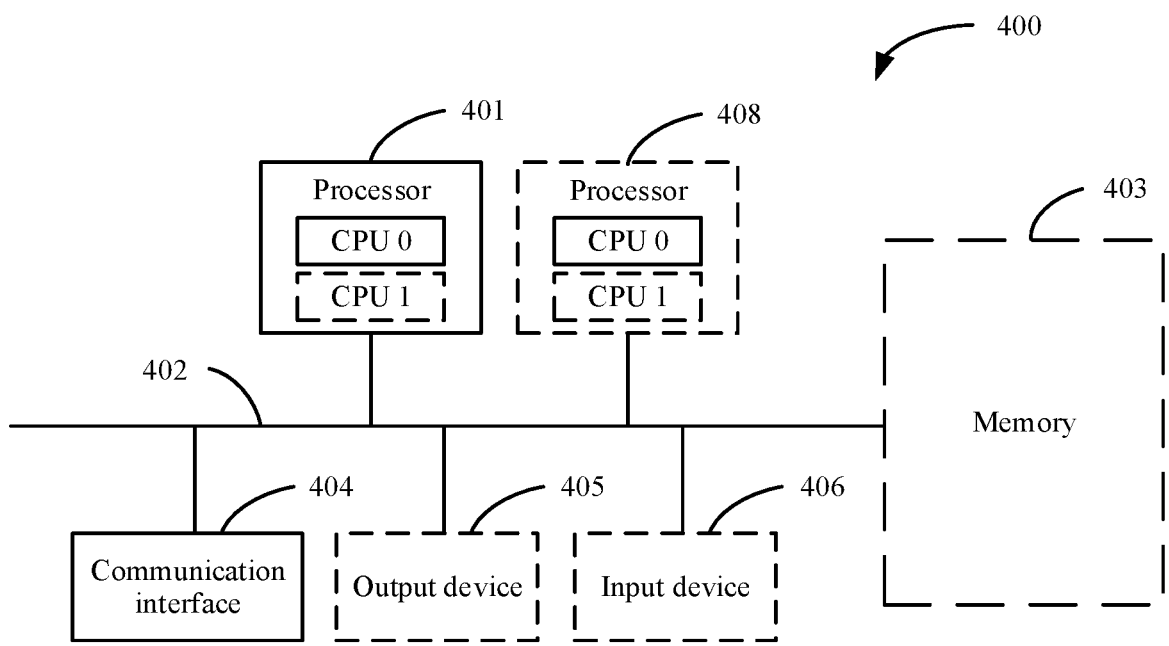
FIG. 4 is a schematic diagram of a structure of a communication device according to an embodiment of this application.

For example, a related function of the C-NWDAF entity or the E-NWDAF entity in an embodiment of this application may be implemented by a communication device 400 in FIG. 4. FIG. 4 is a schematic diagram of a structure of the communication device 400 according to an embodiment of this application. The communication device 400 includes one or more processors 401, a communication line 402, and at least one communication interface (in FIG. 4, an example in which a communication interface 404 and one processor 401 are included is merely used for description), and optionally, may further include a memory 403.

The processor 401 may be a general-purpose central processing unit (CPU), a microprocessor, an application-specific integrated circuit (ASIC), or one or more integrated circuits configured to control program execution of solutions of this application.

The communication line 402 may include a path for connecting different components.

The communication interface 404 may be a transceiver module, configured to communicate with another device or a communication network, such as the Ethernet, a RAN, or a wireless local area network (WLAN). For example, the transceiver module may be an apparatus such as a transceiver or a receiver and transmitter. Optionally, the communication interface 404 may alternatively be a transceiver circuit located in the processor 401, to implement signal input and signal output of the processor.

The memory 403 may be an apparatus having a storage function. For example, the memory 403 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor by using the communication line 402. The memory may alternatively be integrated with the processor.

The memory 403 is configured to store computer-executable instructions for executing the solutions of this application, and the processor 401 controls execution. The processor 401 is configured to execute the computer-executable instructions stored in the memory 403, to implement the training method for an application MOS model provided in this embodiment of this application.

Alternatively, optionally, in an embodiment of this application, the processor 401 may implement a processing-related function in the training method for an application MOS model provided in the following embodiments of this application, and the communication interface 404 is responsible for communicating with another device or a communication network. This is not specifically limited in this embodiment of this application.

Optionally, the computer-executable instructions in this embodiment of this application may also be referred to as application program code. This is not specifically limited in this embodiment of this application.

In some embodiments, the processor 401 may include one or more CPUs, for example, a CPU 0 and a CPU 1 in FIG. 4.

In some embodiments, the communication device 400 may include a plurality of processors, for example, the processor 401 and a processor 408 in FIG. 4. Each of the processors may be a single-core (single-core) processor, or may be a multi-core (multi-core) processor. The processor herein may refer to one or more devices, circuits, and/or processing cores configured to process data (for example, computer program instructions).

In some embodiments, the communication device 400 may further include an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, a projector (projector), or the like. The input device 406 communicates with the processor 401, and may receive an input of a user in a plurality of manners. For example, the input device 406 may be a mouse, a keyboard, a touchscreen device, a sensing device, or the like.

The communication device 400 may also be referred to as a communication apparatus sometimes, and may be a general-purpose device or a dedicated device. For example, the communication device 400 may be an AP, for example, a server, a router, a switch, or a bridge. Alternatively, the communication device 400 may be a STA, for example, a mobile phone, a tablet computer, a computer notebook, a smart watch, or a smart TV. A type of the communication device 400 is not limited in this embodiment of this application.

The following specifically describes, with reference to FIG. 2 to FIG. 4, the training method for an application MOS model provided in the embodiments of this application.

It should be noted that, in the following embodiments of this application, names of messages or names of parameters in messages between entities are merely examples, and the messages or the parameters may have other names in a specific implementation. This is not specifically limited in the embodiments of this application.

Figure 5:
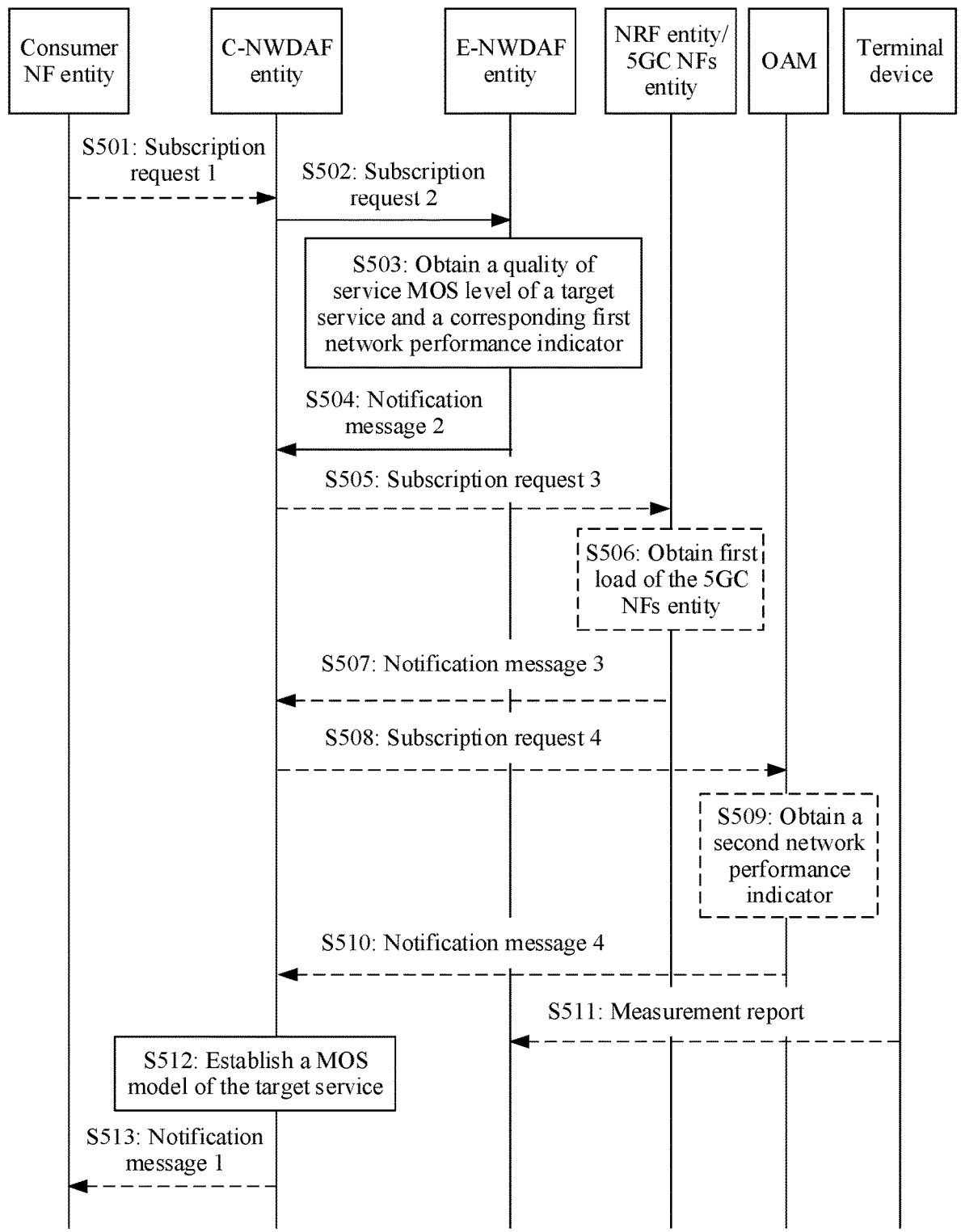
FIG. 5 is a schematic flowchart of a training method for an application MOS model according to an embodiment of this application.

With reference to the communication system shown in FIG. 3, using an example in which the network repository function entity is an NRF entity in a 5G network, FIG. 5 shows a training method for an application MOS model according to an embodiment of this application. The method includes the following steps.

S501: Optionally, a consumer NF entity sends a subscription request 1 to a C-NWDAF entity. Correspondingly, the C-NWDAF entity receives the subscription request 1 from the consumer NF entity, where the subscription request 1 is used to request to subscribe to a MOS model of a specified service.

It should be noted that step S501 is an optional step. In other words, step S501 may not be performed in the training method for an application MOS model provided in this embodiment of this application.

S502: The C-NWDAF entity sends a subscription request 2 to an E-NWDAF entity. Correspondingly, the E-NWDAF entity receives the subscription request 2 from the C-NWDAF entity, where the subscription request 2 is used to request to subscribe to a quality of service MOS level of a target service and a corresponding first network performance indicator, and the first network performance indicator is a network performance indicator of a transmission network that carries the target service.

Optionally, in an embodiment of this application, the first network performance indicator includes one or more of the following parameters:

a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between a terminal device and an access network device;

a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the access network device and a user plane entity; and a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the user plane entity and an AF entity.

It should be noted that the RTT in this embodiment of this application includes an uplink RTT and a downlink RTT. The uplink RTT may be understood as a time interval between a time point at which the terminal device sends an uplink data packet and a time point at which the terminal device receives a response frame of the uplink data packet. The downlink RTT may be understood as a time interval between a time point at which the AF entity sends a downlink data packet and a time point at which the AF entity receives a response frame of the downlink data packet.

Figure 6:
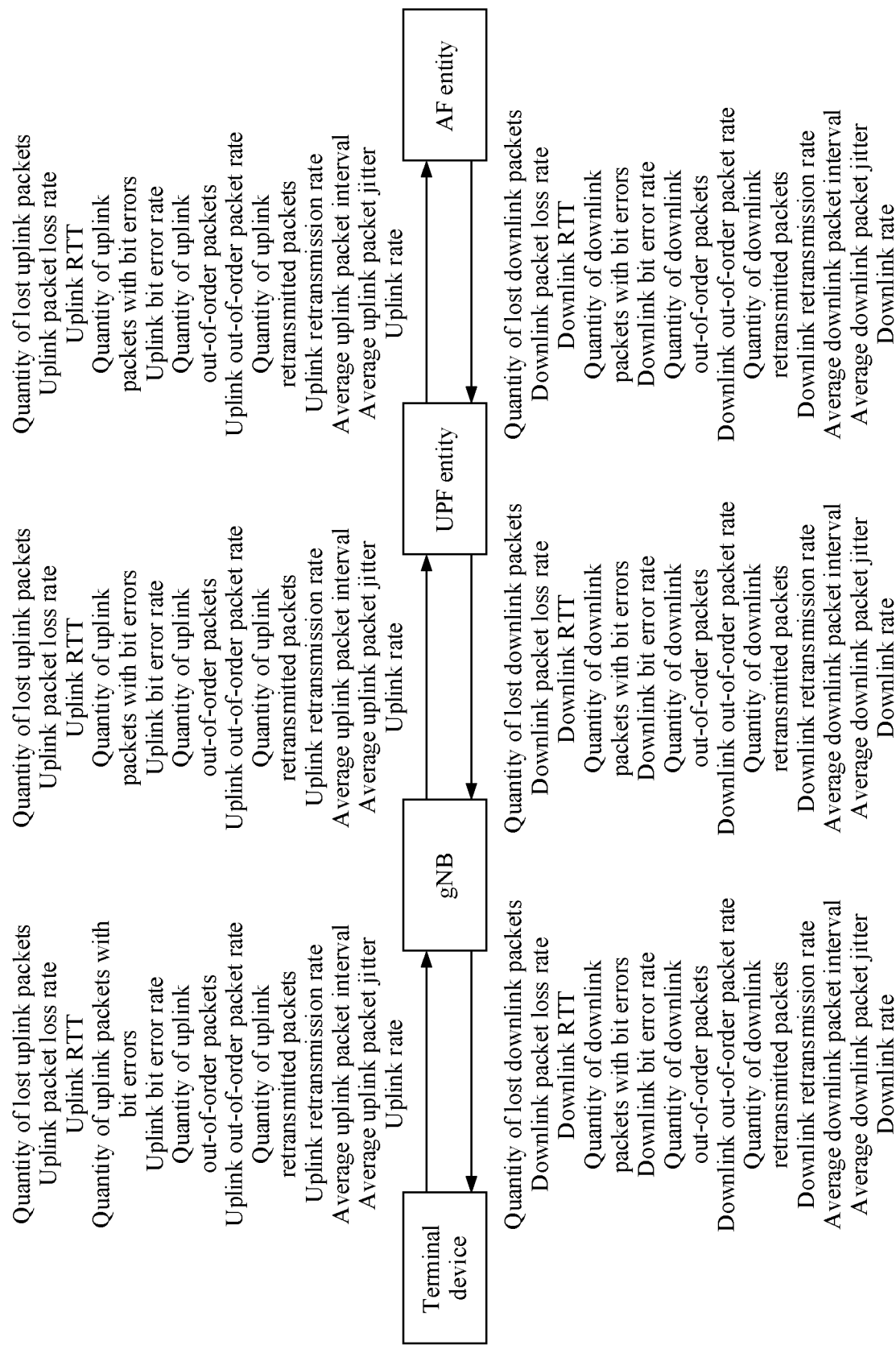
FIG. 6 is a schematic diagram of a first network performance indicator according to an embodiment of this application.

For example, the access network device is a next generation NodeB (gNB) in the 5G network, and the user plane entity is a UPF entity in the 5G network. FIG. 6 is a schematic diagram of a first network performance indicator according to an embodiment of this application. The first network performance indicator includes one or more of a network performance indicator between the terminal device and the gNB, a network performance indicator between the gNB and the UPF entity, or a network performance indicator between the UPF entity and the AF entity.

S503: The E-NWDAF entity obtains the quality of service MOS level of the target service and the corresponding first network performance indicator.

Optionally, in an embodiment of this application, the E-NWDAF entity may collect original service data of a user through traffic mirroring, implantation of an NF proxy, or the like, and perform the following steps:

first, identifying a service type of the user, for example, a video service or a VR service;

second, measuring service experience data based on service experience of the user, and determine the quality of service MOS level based on the service experience data, where for example, when the target service is the video service, the service experience data includes one or more of the following parameters: an initial buffering delay, playback buffer duration, a bit rate, a service rate, a frame rate, smoothness, and a definition of the video service, and a resolution of the terminal device; and third, measuring the network performance indicator of the transmission network that carries the target service, in other words, measuring the first network performance indicator.

S504: The E-NWDAF entity sends a notification message 2 to the C-NWDAF entity. The C-NWDAF entity receives the notification message 2 from the E-NWDAF entity, where the notification message 2 includes the quality of service MOS level of the target service and the corresponding first network performance indicator.

Optionally, the training method for an application MOS model provided in this embodiment of this application may further include the following steps S505 to S507.

S505: The C-NWDAF entity sends a subscription request 3 to the NRF entity/a 5GC NFs entity. Correspondingly, the NRF entity/the 5GC NFs entity receives the subscription request 3 from the C-NWDAF entity, where the subscription request 3 is used to request to subscribe to a first load of the 5GC NFs entity.

Optionally, in an embodiment of this application, the first load of the 5GC NFs entity includes one or more of the following parameters:

a quantity of sessions of the 5GC NFs entity, a quantity of users of the 5GC NFs entity, and resource usage of the 5GC NFs entity.

For example, the resource usage of the 5GC NFs entity may include, for example, CPU, memory, or network I/O usage.

S506: The NRF entity/the 5GC NFs entity obtains the first load of the 5GC NFs entity.

S507: The NRF entity/the 5GC NFs entity sends a notification message 3 to the C-NWDAF entity. Correspondingly, the C-NWDAF entity receives the notification message 3 from the NRF entity/the 5GC NFs entity, where the notification message 3 includes the first load of the 5GC NFs entity.

Optionally, the training method for an application MOS model provided in this embodiment of this application may further include the following steps S508 to S510.

S508: The C-NWDAF entity sends a subscription request 4 to an OAM. Correspondingly, the OAM entity receives the subscription request 4 from the C-NWDAF entity, where the subscription request 4 is used to request to subscribe to a second network performance indicator, and the second network performance indicator is a performance indicator of a radio network that carries the target service.

Optionally, in an embodiment of this application, the second network performance indicator includes one or more of the following parameters:

a quantity of sessions, a quantity of RRC connected users, a congestion status, and resource usage of the access network device, a radio measurement indicator of the terminal device, and location information of the terminal device.

For example, the quantity of RRC connected users may include, for example, a quantity of users in an RRC_inactive (inactive) state and a quantity of users in an RRC_active (active) state.

For example, the resource usage of the access network device may include, for example, uplink or downlink physical resource block (PRB) usage, or CPU or memory usage.

For example, the radio measurement indicator of the terminal device may include, for example, reference signal received power (RSRP), reference signal received quality (reference signal receiving quality, RSRQ), or a signal-to-interference plus noise ratio (SINR).

S509: The OAM entity obtains the second network performance indicator.

S510: The OAM entity sends a notification message 4 to the C-NWDAF entity. Correspondingly, the C-NWDAF entity receives the notification message 4 from the OAM, where the notification message 4 includes the second network performance indicator.

Optionally, the training method for an application MOS model provided in this embodiment of this application may further include the following step S511.

S511: The terminal device sends a measurement report to the C-NWDAF entity. Correspondingly, the C-NWDAF entity receives the measurement report from the terminal device. The measurement report includes information about the terminal device and one or more of the following information: the quality of service MOS level of the target service, the quantity of lost uplink packets, the uplink packet loss rate, the quantity of lost downlink packets, the downlink packet loss rate, the RTT, the average uplink packet interval, the average uplink packet jitter, the average downlink packet interval, the average downlink packet jitter, the uplink rate, and the downlink rate on the corresponding path between the terminal device and the access network device, or the radio measurement indicator of the terminal device.

For example, the information about the terminal device may include, for example, a model, a CPU, or a memory capacity of the terminal device.

After the C-NWDAF entity obtains the required information, the training method for an application MOS model provided in this embodiment of this application may further include the following step S512.

S512: The C-NWDAF entity establishes the MOS model of the target service based on the quality of service MOS level and the first network performance indicator. The MOS model of the target service includes a model relationship between the quality of service MOS level and the first network performance indicator.

Optionally, when steps S505 to S507, steps S508 to S510, or step S511 are/is performed, that the C-NWDAF entity establishes the MOS model of the target service based on the quality of service MOS level and the first network performance indicator includes: The C-NWDAF entity excludes a sample whose quality of service MOS is poor due to an exception of the terminal device and a sample whose quality of service MOS is poor due to an exception of the AF entity based on the quality of service MOS level, the first network performance indicator, the measurement report of the terminal device, and the second network performance indicator and/or the first load of the 5GC NFs entity, and establishes the MOS model of the target service. In this case, the MOS model of the target service includes a model relationship between the quality of service MOS level and the second network performance indicator and/or the first load of the 5GC NFs entity, and the model relationship between the quality of service MOS level and the first network performance indicator.

Optionally, in an embodiment of this application, if step S501 is performed, the training method for an application MOS model provided in this embodiment of this application may further include the following step S513.

S513: The C-NWDAF entity sends a notification message 1 to the consumer NF entity. Correspondingly, the consumer NF entity receives the notification message 1 from the C-NWDAF entity, where the notification message 1 includes the MOS model of the target service.

Optionally, in an embodiment of this application, the consumer NF entity in an area managed by the E-NWDAF entity may alternatively subscribe to the MOS model of the specified service from the E-NWDAF entity. Further, after obtaining the quality of service MOS level of the target service and the corresponding first network performance indicator, the E-NWDAF entity establishes the MOS model of the target service based on the quality of service MOS level and the first network performance indicator, and sends the MOS model of the target service to the consumer NF entity in the area managed by the E-NWDAF entity. This is not specifically limited in this embodiment of this application. Certainly, the terminal device may alternatively send the measurement report to the E-NWDAF entity, and the E-NWDAF entity may subscribe to the quality of service MOS level and the second network performance indicator and/or the first load of the 5GC NFs entity. Further, the E-NWDAF entity may exclude a sample whose quality of service MOS is poor due to an exception of the terminal device and a sample whose quality of service MOS is poor due to an exception of the AF entity based on the quality of service MOS level, the first network performance indicator, the measurement report of the terminal device, and the second network performance indicator and/or the first load of the 5GC NFs entity, and establishes the MOS model of the target service. This is not specifically limited in this embodiment of this application.

Optionally, in an embodiment of this application, after obtaining the MOS model of the target service, the C-NWDAF entity or the E-NWDAF entity may generate a recommended QoS file based on the MOS model of the target service, to help a carrier to provide differentiated quality of service assurance for a terminal user, an OTT vendor, and an industry. If the consumer NF entity receives the recommended QoS file sent by the C-NWDAF entity or the E-NWDAF entity, the consumer NF entity may select, based on a preconfigured priority rule or a corresponding determining algorithm, a corresponding QoS file to be used.

Based on the training method for an application MOS model provided in an embodiment of this application, the carrier deploys distributed NWDAF entities including the C-NWDAF entity and the E-NWDAF entity, the C-NWDAF entity may subscribe to the quality of service MOS level of the target service and the corresponding first network performance indicator from the E-NWDAF entity, and the E-NWDAF entity obtains the quality of service MOS level of the target service and the corresponding first network performance indicator through synchronous measurement, that is, the E-NWDAF entity obtains the quality of service MOS level of the target service and the corresponding first network performance indicator inside the carrier. Therefore, the implementation is easier and the measurement result is more accurate. In another aspect, because the first network performance indicator, the sample whose quality of service MOS is poor due to the exception of the terminal device, the sample whose quality of service MOS is poor due to the exception of the AF entity, and the performance indicator of the radio network that carries the target service and/or the first load of the 5GC NFs entity corresponding to the MOS level are considered, the MOS model of the target service established using the training method for an application MOS model provided in this embodiment of this application is more accurate and comprehensive.

An action of the C-NWDAF entity or the E-NWDAF entity in steps S501 to S513 may be performed by the processor 401 in the communication device 400 shown in FIG. 4 by invoking the application program code stored in the memory 403. This is not limited in this embodiment of this application.

The following provides a related example of providing real-time service experience assurance for the user based on the MOS model of the target service provided and with reference to current service experience quality of the terminal device.

Figure 7:
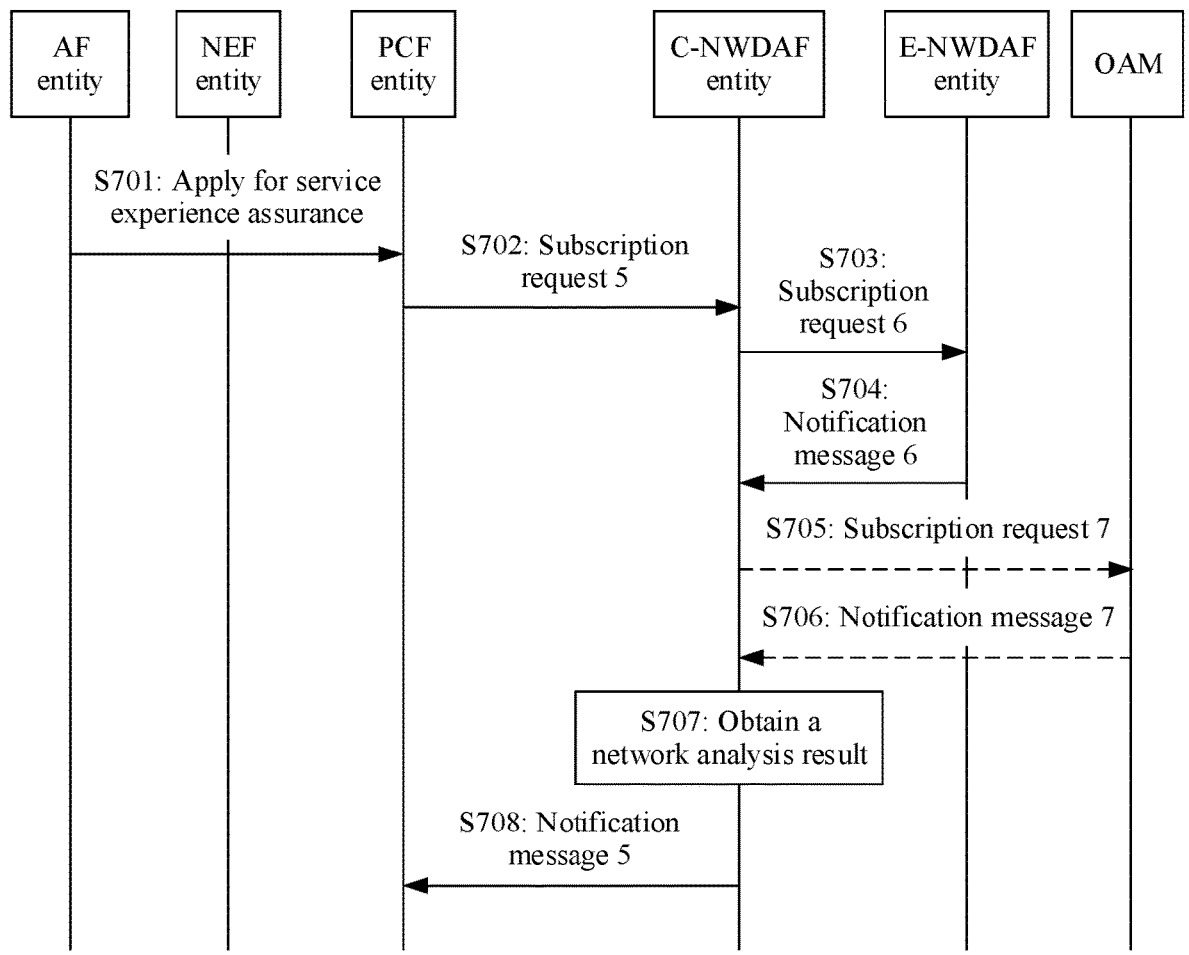
FIG. 7 is a schematic flowchart 1 of a service experience assurance method according to an embodiment of this application.

Example 1: Service experience assurance in the 5G network is used as an example. As shown in FIG. 7, a service experience assurance method according to an embodiment of this application includes the following steps.

S701: An AF entity applies to a policy control function (PCF) entity through a network exposure function (NEF) entity to provide service experience assurance for a target service of a target terminal device.

Optionally, in an embodiment of this application, for a trusted application, the AF entity may alternatively apply to the PCF entity to provide the service experience assurance for the target service. This is not specifically limited in this embodiment of this application.

Optionally, the service experience assurance in this embodiment of this application may alternatively be replaced with QoS optimization.

S702: The PCF entity sends a subscription request 5 to a C-NWDAF entity. Correspondingly, the C-NWDAF entity receives the subscription request 5 from the PCF entity, where the subscription request 5 is used to request to provide the service experience assurance for the target service of the target terminal device, and a quality of service MOS level requirement for the service experience assurance is a first quality of service MOS level.

S703: The C-NWDAF entity sends a subscription request 6 to an E-NWDAF entity. Correspondingly, the E-NWDAF entity receives the subscription request 6 from the C-NWDAF entity, where the subscription request 6 is used to request to subscribe to a trigger event for using the target service by the target terminal device, a second quality of service MOS level of the target service, and a corresponding first network performance indicator.

For related descriptions of the first network performance indicator, refer to the embodiment shown in FIG. 5. Details are not described herein again.

S704: After the trigger event is triggered, the E-NWDAF entity obtains the second quality of service MOS level of the target service and the corresponding first network performance indicator, and sends a notification message 6 to the C-NWDAF entity, where the notification message 6 includes the second quality of service MOS level of the current target service and the corresponding first network performance indicator.

S705: The C-NWDAF entity sends a subscription request 7 to an OAM. Correspondingly, the OAM entity receives the subscription request 7 from the C-NWDAF entity, where the subscription request 7 is used to request to subscribe to a second network performance indicator.

For related descriptions of the second network performance indicator, refer to the embodiment shown in FIG. 5. Details are not described herein again.

S706: After obtaining the second network performance indicator, the OAM entity sends a notification message 7 to the C-NWDAF entity. Correspondingly, the C-NWDAF entity receives the notification message 7 from the OAM, where the notification message 7 includes the current second network performance indicator.

S707: When the second quality of service MOS level is different from the first quality of service MOS level, the C-NWDAF entity matches the first network performance indicator corresponding to the second quality of service MOS level with a first network performance indicator corresponding to the first quality of service MOS level in a MOS model of the target service, and the C-NWDAF entity matches a second network performance indicator corresponding to the second quality of service MOS level with a second network performance indicator corresponding to the first quality of service MOS level in the MOS model of the target service, to obtain a network analysis result.

Optionally, the network analysis result is used to represent a reason why the second quality of service MOS level is different from the first quality of service MOS level. For example, a network performance indicator between the terminal device and a current access network device is poor, a network performance indicator between the current access network device and a UPF entity is poor, or a network performance indicator between the UPF entity and the AF entity is poor. This is not specifically limited herein.

It should be noted that steps S705 and S706 are optional steps. If steps S705 and S706 are not performed, in step S707, the C-NWDAF entity does not need to match the second network performance indicator corresponding to the second quality of service MOS level with the second network performance indicator corresponding to the first quality of service MOS level in the MOS model of the target service.

S708: The C-NWDAF entity sends a notification message 5 to the PCF entity. Correspondingly, the PCF entity receives the notification message 5 from the C-NWDAF entity, where the notification message 5 includes the network analysis result.

Optionally, in an embodiment of this application, the PCF entity may notify, based on the network analysis result, a session management function (SMF) entity or the UPF entity to update a QoS policy and network parameter optimization of the terminal device, for example, a radio scheduling priority or a transport layer differentiated services code point (DSCP) level. This is not specifically limited in this embodiment of this application.

Figure 8:
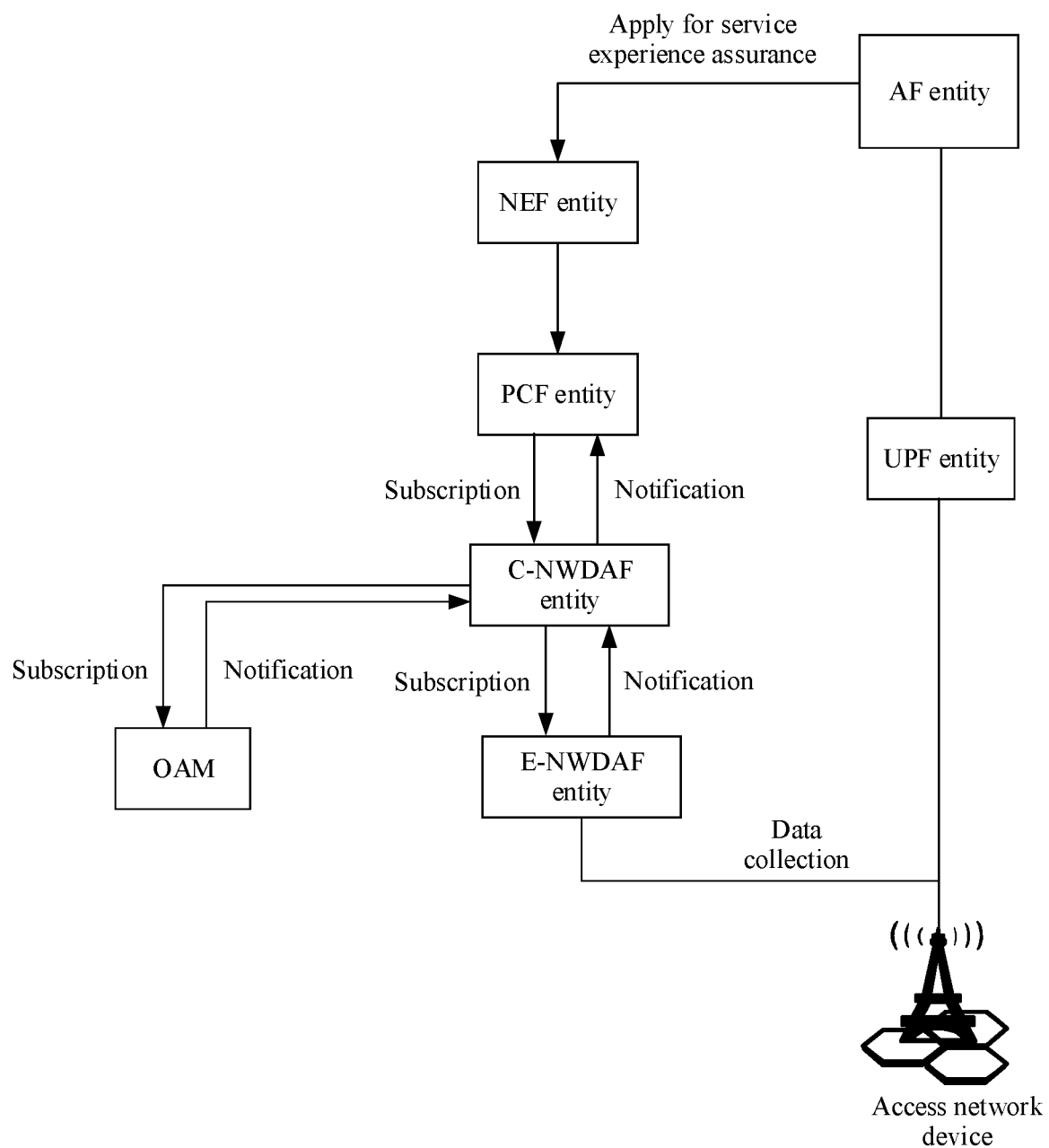
FIG. 8 is a schematic diagram of an architecture corresponding to the service experience assurance method shown in FIG. 7.

FIG. 8 is a schematic diagram of an architecture corresponding to the service experience assurance method shown in FIG. 7. Based on the service experience assurance method provided in this embodiment of this application, real-time service experience assurance can be provided for a user.

Figure 9:
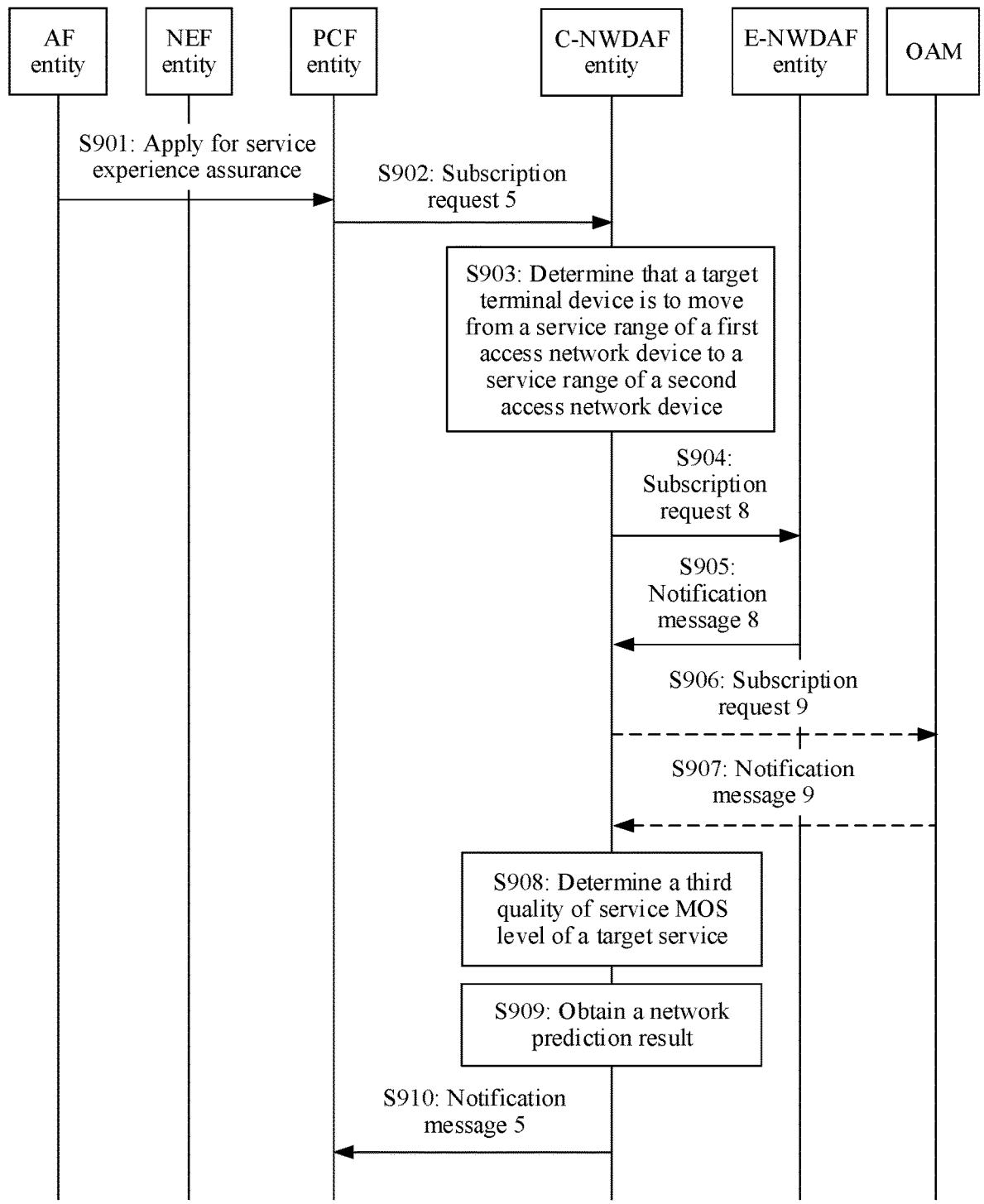
FIG. 9 is a schematic flowchart 2 of a service experience assurance method according to an embodiment of this application.

Example 2: Service experience assurance in the 5G network is used as an example. As shown in FIG. 9, another service experience assurance method according to an embodiment of this application includes the following steps.

S901: An AF entity applies to a PCF entity through an NEF entity to provide service experience assurance for a target service of a target terminal device.

Optionally, in an embodiment of this application, for a trusted application, the AF entity may apply to the PCF entity to provide the service experience assurance for the target service. This is not specifically limited in this embodiment of this application.

Optionally, the service experience assurance in this embodiment of this application may alternatively be replaced with QoS optimization.

S902: The PCF entity sends a subscription request 5 to a C-NWDAF entity. Correspondingly, the C-NWDAF entity receives the subscription request 5 from the PCF entity, where the subscription request 5 is used to request to provide the service experience assurance for the target service of the target terminal device, and a quality of service MOS level requirement for the service experience assurance is a first quality of service MOS level.

S903: The C-NWDAF entity determines, based on a movement track of the target terminal device, that the target terminal device is to move from a service range of a first access network device to a service range of a second access network device.

Optionally, in an embodiment of this application, the movement track of the target terminal device may be obtained by an E-NWDAF entity and then sent to the C-NWDAF entity, or may be obtained by the C-NWDAF entity in another manner. This is not specifically limited in this embodiment of this application.

S904: The C-NWDAF entity sends a subscription request 8 to the E-NWDAF entity. Correspondingly, the E-NWDAF entity receives the subscription request 8 from the C-NWDAF entity, where the subscription request 8 is used to request to subscribe to a trigger event for using the target service by the target terminal device and a first network performance indicator associated with the second access network device.

For example, in an embodiment of this application, the first network performance indicator associated with the second access network device may include, for example, one or more of the following parameters:

a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the terminal device and the second access network device;

a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the second access network device and a user plane entity; and a quantity of lost uplink packets, an uplink packet loss rate, a quantity of lost downlink packets, a downlink packet loss rate, an RTT, a quantity of uplink packets with bit errors, an uplink bit error rate, a quantity of downlink packets with bit errors, a downlink error bit rate, a quantity of uplink out-of-order packets, an uplink out-of-order packet rate, a quantity of downlink out-of-order packets, a downlink out-of-order packet rate, a quantity of uplink retransmitted packets, an uplink retransmission rate, a quantity of downlink retransmitted packets, a downlink retransmission rate, an average uplink packet interval, an average uplink packet jitter, an average downlink packet interval, an average downlink packet jitter, an uplink rate, and a downlink rate on a path between the user plane entity and an AF entity.

S905: After the trigger event is triggered, the E-NWDAF entity obtains the first network performance indicator associated with the second access network device, and sends a notification message 8 to the C-NWDAF entity, where the notification message 8 includes the first network performance indicator associated with the second access network device.

S906: The C-NWDAF entity sends a subscription request 9 to an OAM. Correspondingly, the OAM entity receives the subscription request 9 from the C-NWDAF entity, where the subscription request 9 is used to request to subscribe to a second network performance indicator associated with the second access network device.

Optionally, in an embodiment of this application, the second network performance indicator associated with the second access network device includes one or more of the following parameters:

a quantity of sessions, a quantity of RRC connected users, a congestion status, and resource usage of the second access network device, a radio measurement indicator of the terminal device, and location information of the terminal device. For related descriptions of the quantity of RRC connected users, the resource usage, and the radio measurement indicator of the terminal device, refer to descriptions in the embodiment shown in FIG. 5. Details are not described herein again.

S907: After obtaining the second network performance indicator associated with the second access network device, the OAM entity sends a notification message 9 to the C-NWDAF entity. Correspondingly, the C-NWDAF entity receives the notification message 9 from the OAM, where the notification message 9 includes the second network performance indicator associated with the second access network device.

S908: The C-NWDAF entity matches the first network performance indicator and the second network performance indicator that are associated with the second access network device with a MOS model of the target service, to determine a third quality of service MOS level of the target service corresponding to the first network performance indicator and the second network performance indicator that are associated with the second access network device.

S909: When the third quality of service MOS level is different from the first quality of service MOS level, the C-NWDAF entity matches the first network performance indicator corresponding to the third quality of service MOS level with a first network performance indicator corresponding to the first quality of service MOS level in the MOS model of the target service, and the C-NWDAF entity matches the second network performance indicator corresponding to the third quality of service MOS level with a second network performance indicator corresponding to the first quality of service MOS level in the MOS model of the target service, to obtain a network prediction result.

Optionally, the network prediction result is used to represent a reason why the third quality of service MOS level is different from the first quality of service MOS level. For example, a network performance indicator between the terminal device and a current access network device is poor, a network performance indicator between the current access network device and a UPF entity is poor, or a network performance indicator between the UPF entity and the AF entity is poor. This is not specifically limited herein.

It should be noted that steps S906 and S907 are optional steps. If steps S906 and S907 are not performed, in step S908, the C-NWDAF entity does not need to match the second network performance indicator associated with the second access network device with the MOS model of the target service, and only needs to determine the third quality of service MOS level of the target service corresponding to the first network performance indicator associated with the second access network device. In addition, if steps S906 and S907 are not performed, in step S909, the C-NWDAF entity does not need to match the second network performance indicator corresponding to the third quality of service MOS level with the second network performance indicator corresponding to the first quality of service MOS level in the MOS model of the target service.

S910: The C-NWDAF entity sends a notification message 5 to the PCF entity. Correspondingly, the PCF entity receives the notification message 5 from the C-NWDAF entity, where the notification message 5 includes the network prediction result.

Optionally, in an embodiment of this application, the PCF entity may recommend that, based on the network prediction result, the UPF entity update a QoS policy of the user after entering the service range of the second access network device. This is not specifically limited in this embodiment of this application.

Figure 10:
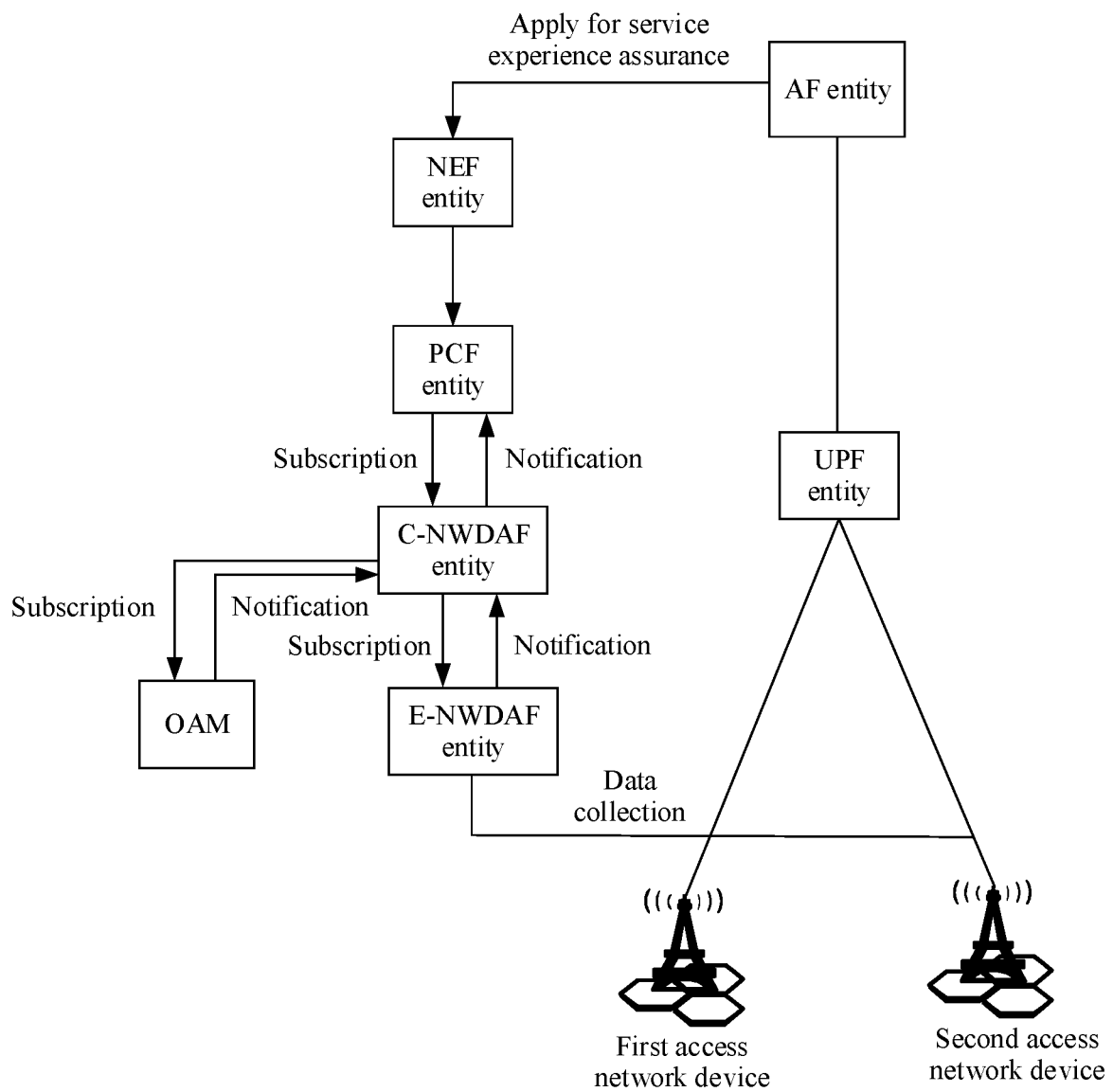
FIG. 10 is a schematic diagram of an architecture corresponding to the service experience assurance method shown in FIG. 9.

FIG. 10 is a schematic diagram of an architecture corresponding to the service experience assurance method shown in FIG. 9. Based on the service experience assurance method provided in this embodiment of this application, real-time service experience assurance can be provided for a user.

It may be understood that, in the foregoing embodiments, the methods and/or steps implemented by the C-NWDAF entity may also be implemented by a component used in the C-NWDAF entity, and the methods and/or steps implemented by the E-NWDAF entity may also be implemented by a component used in the E-NWDAF entity.

The foregoing mainly describes the solutions provided in the embodiments of this application from the perspective of interaction between entities. Correspondingly, an embodiment of this application further provides a communication apparatus. The communication apparatus may be the C-NWDAF entity in the foregoing method embodiments, an apparatus including the C-NWDAF entity, or a component that may be used in the C-NWDAF entity. Alternatively, the communication apparatus may be the E-NWDAF entity in the foregoing method embodiments, an apparatus including the E-NWDAF entity, or a component that can be used in the E-NWDAF entity. It can be understood that, to implement the foregoing functions, the communication apparatus includes a corresponding hardware structure and/or software module for implementing the functions. A person skilled in the art should be understand that that, in combination with the units and algorithm steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, and such implementation is within the scope of this application.

Figure 11:
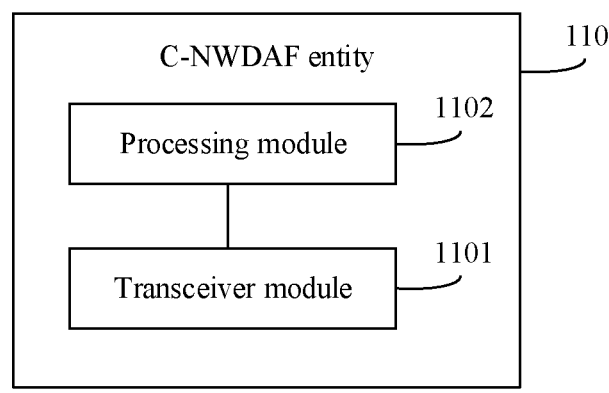
FIG. 11 is a schematic diagram of a structure of a C-NWDAF entity according to an embodiment of this application.

For example, the communication apparatus is the C-NWDAF entity in the foregoing method embodiments. FIG. 11 is a schematic diagram of a structure of a C-NWDAF entity 110. The C-NWDAF entity 110 includes a transceiver module 1101 and a processing module 1102. The transceiver module 1101 may also be referred to as a transceiver unit, and is configured to implement a transceiver function. For example, the transceiver module 1101 may be a transceiver circuit, a transceiver, or a communication interface.

The transceiver module 1101 is configured to send a first subscription request to an E-NWDAF entity, where the first subscription request is used to request to subscribe to a quality of service MOS level of a target service and a corresponding first network performance indicator, and the first network performance indicator is a network performance indicator of a transmission network that carries the target service. The transceiver module 1101 is further configured to receive the quality of service MOS level and the first network performance indicator from the E-NWDAF entity. The processing module 1102 is configured to establish a MOS model of the target service based on the quality of service MOS level and the first network performance indicator.

Optionally, the processing module 1102 is further configured to obtain a second network performance indicator corresponding to the MOS level and/or a first load of a first network function entity corresponding to the MOS level, where the second network performance indicator is a performance indicator of a radio network that carries the target service, and the first network function entity is a network data provider function entity. That the processing module 1102 is configured to establish a MOS model of the target service based on the quality of service MOS level and the first network performance indicator includes: The processing module 1102 is configured to: exclude a sample whose quality of service MOS is poor due to an exception of a terminal device and a sample whose quality of service MOS is poor due to an exception of an application function entity based on the second network performance indicator, the first load of the first network function entity, the quality of service MOS level, and the first network performance indicator, and establish the MOS model of the target service.

Optionally, that the processing module 1102 is configured to obtain a first load of a first network function entity corresponding to the MOS level includes: The processing module 1102 is configured to: send a second subscription request to a network repository function entity through the transceiver module 1101, where the second subscription request is used to request to subscribe to the first load of the first network function entity; and receive the first load of the first network function entity from the network repository function entity through the transceiver module 1101.

Optionally, that the processing module 1102 is configured to obtain a second network performance indicator corresponding to the MOS level includes: The processing module 1102 is configured to: send a third subscription request to an operation administration and maintenance OAM entity of a carrier network through the transceiver module 1101, where the third subscription request is used to request to subscribe to the second network performance indicator; and receive the second network performance indicator from the OAM entity through the transceiver module 1101.

Optionally, the transceiver module 1101 is further configured to receive a fourth subscription request from a second network function entity, where the fourth subscription request is used to request to subscribe to the MOS model of the target service, and the second network function entity is a consumer function entity. The transceiver module 1101 is further configured to send the MOS model of the target service to the second network function entity.

Optionally, the transceiver module 1101 is further configured to receive a fifth subscription request from a policy control entity, where the fifth subscription request is used to request to provide service experience assurance for the target service of the target terminal device, and a quality of service MOS level requirement for the service experience assurance is a first quality of service MOS level. The transceiver module 1101 is further configured to send a sixth subscription request to the E-NWDAF entity, where the sixth subscription request is used to request to subscribe to a trigger event for using the target service by the target terminal device, a second quality of service MOS level of the target service, and a corresponding first network performance indicator. The transceiver module 1101 is further configured to: after the trigger event is triggered, receive the second quality of service MOS level and the corresponding first network performance indicator from the E-NWDAF entity. The processing module 1102 is further configured to: when the second quality of service MOS level is different from the first quality of service MOS level, match the first network performance indicator corresponding to the second quality of service MOS level with a first network performance indicator corresponding to the first quality of service MOS level in the MOS model of the target service, to obtain a network analysis result. The transceiver module 1101 is further configured to send the network analysis result to the policy control entity, where the network analysis result is used for network optimization.

Optionally, the transceiver module 1101 is further configured to receive a fifth subscription request from a policy control entity, where the fifth subscription request is used to request to provide service experience assurance for the target service of the target terminal device, and a quality of service MOS level requirement for the service experience assurance is a first quality of service MOS level. The processing module 1102 is further configured to determine, based on a movement track of the target terminal device, that the target terminal device is to move from a service range of a first access network device to a service range of a second access network device. The transceiver module 1101 is further configured to send a sixth subscription request to the E-NWDAF entity, where the sixth subscription request is used to request to subscribe to a trigger event for using the target service by a target terminal device and a first network performance indicator associated with the second access network device. The transceiver module 1101 is further configured to: after the trigger event is triggered, receive the first network performance indicator associated with the second access network device from the E-NWDAF entity. The processing module 1102 is further configured to match the first network performance indicator associated with the second access network device with the MOS model of the target service, to determine a third quality of service MOS level of the target service corresponding to the first network performance indicator associated with the second access network device. The processing module 1102 is further configured to: when the third quality of service MOS level is different from the first quality of service MOS level, match the first network performance indicator corresponding to the third quality of service MOS level with a first network performance indicator corresponding to the first quality of service MOS level in the MOS model of the target service, to obtain a network prediction result. The transceiver module 1101 is further configured to send the network prediction result to the policy control entity, where the network prediction result is used for network optimization.

All related content of the steps in the foregoing method embodiments may be relied upon for understanding the function descriptions of a corresponding function module. Details are not described herein again.

In some embodiments, the C-NWDAF entity 110 is presented in a form of function modules obtained through division in an integrated manner. The "module" herein may be an application-specific integrated circuit (ASIC), a circuit, a processor executing one or more software or firmware programs, a memory, an integrated logic circuit, and/or another device that can provide the foregoing function. In an embodiment, a person skilled in the art may understand that the C-NWDAF entity 110 may be in a form of the communication device 400 shown in FIG. 4.

For example, the processor 401 in the communication device 400 shown in FIG. 4 may invoke the computer-executable instructions stored in the memory 403, to enable the communication device 400 to perform the training method for an application MOS model in the foregoing method embodiments.

Specifically, the functions/implementation processes of the transceiver module 1101 and the processing module 1102 in FIG. 11 may be implemented by the processor 401 in the communication device 400 in FIG. 4 by invoking the computer-executable instructions stored in the memory 403. Alternatively, the functions/implementation processes of the processing module 1102 in FIG. 11 may be implemented by the processor 401 in the communication device 400 shown in FIG. 4 by invoking the computer-executable instructions stored in the memory 403. The functions/implementation processes of the transceiver module 1101 in FIG. 11 may be implemented by the communication interface 404 in the communication device 400 shown in FIG. 4.

The C-NWDAF entity 110 provided in this embodiment can perform the foregoing training method for an application MOS model. Therefore, for technical effects that can be achieved by the C-NWDAF entity 110, refer to the foregoing method embodiments. Details are not described herein again.

Figure 12:
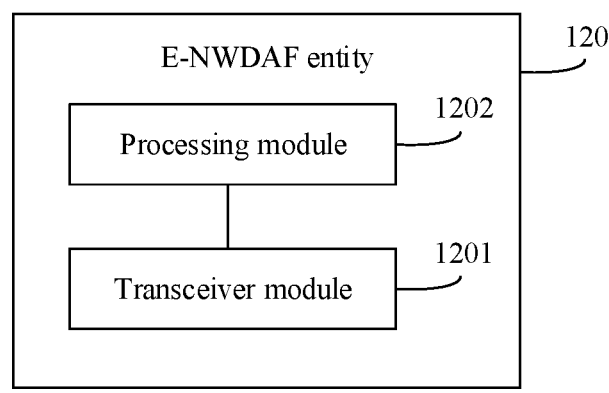
FIG. 12 is a schematic diagram of a structure of an E-NWDAF entity according to an embodiment of this application.

For example, the communication apparatus is the E-NWDAF entity in the foregoing method embodiments. FIG. 12 is a schematic diagram of a structure of an E-NWDAF entity 120. The E-NWDAF entity 120 includes a transceiver module 1201 and a processing module 1202. The transceiver module 1201 may also be referred to as a transceiver unit, and is configured to implement a transceiver function. For example, the transceiver module 1201 may be a transceiver circuit, a transceiver, or a communication interface.

The transceiver module 1201 is configured to receive a first subscription request from a C-NWDAF entity, where the first subscription request is used to request to subscribe to a quality of service mean opinion score MOS level of a target service and a corresponding first network performance indicator, and the first network performance indicator is a network performance indicator of a transmission network that carries the target service. The processing module 1202 is configured to obtain the quality of service MOS level and the first network performance indicator. The transceiver module 1201 is further configured to send the quality of service MOS level and the first network performance indicator to the C-NWDAF entity.

Optionally, that the processing module 1202 is configured to obtain the quality of service MOS level includes: The processing module 1202 is configured to: obtain service experience data of the target service, and determine the quality of service MOS level based on the service experience data of the target service.

All related content of the steps in the foregoing method embodiments may be relied on for understanding in function descriptions of a corresponding function module. Details are not described herein again.

In this embodiment, the E-NWDAF entity 120 is presented in a form of function modules obtained through division in an integrated manner. The "module" herein may be an application-specific integrated circuit (ASIC), a circuit, a processor executing one or more software or firmware programs, a memory, an integrated logic circuit, and/or another device that can provide the foregoing function. In a simple embodiment, a person skilled in the art may understand that the E-NWDAF entity 120 may be in a form of the communication device 400 shown in FIG. 4.

For example, the processor 401 in the communication device 400 shown in FIG. 4 may invoke the computer-executable instructions stored in the memory 403, to enable the communication device 400 to perform the training method for an application MOS model in the foregoing method embodiments.

Specifically, the functions/implementation processes of the transceiver module 1201 and the processing module 1202 in FIG. 12 may be implemented by the processor 401 in the communication device 400 in FIG. 4 by invoking the computer-executable instructions stored in the memory 403. Alternatively, the functions/implementation processes of the processing module 1202 in FIG. 12 may be implemented by the processor 401 in the communication device 400 shown in FIG. 4 by invoking the computer-executable instructions stored in the memory 403. The functions/implementation processes of the transceiver module 1201 in FIG. 12 may be implemented by the communication interface 404 in the communication device 400 shown in FIG. 4.

The E-NWDAF entity 120 provided in this embodiment can perform the foregoing training method for an application MOS model. Therefore, for technical effects that can be achieved by the E-NWDAF entity 120, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a manner of computer program instructions and is stored in a memory. A processor may be configured to: execute the program instructions and implement the foregoing method procedure. The processor may be built into a SoC (system-on-a-chip) or an ASIC, or may be an independent semiconductor chip. In addition to a core configured to execute software instructions to perform an operation or processing, the processor may further include a necessary hardware accelerator, such as a field programmable gate array (FPGA), a PLD (programmable logic device), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or be independent of software to perform the foregoing method procedure.

Optionally, the embodiments of this application further provide a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may not be in the communication apparatus. When the communication apparatus is a chip system, the chip system may include a chip, or include a chip and other discrete devices. This is not specifically limited in this embodiment of this application.

In the descriptions of this application, "I" indicates that associated objects are in an "or" relationship unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In the three cases, A. B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference. In addition, in the embodiments of this application, a word such as "example" or "for example" is used to represent giving an example, an illustration, or a description. Any embodiment or design scheme described as an "example" or with "for example" in the embodiments of this application should not be explained as being more preferred or having more advantages than another embodiment or design scheme. Exactly, use of the word "example", "for example", or the like is intended to present a relative concept in a specific manner for ease of understanding.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, all or some of the procedures or functions are generated according to the embodiments of this application. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and is considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and equivalent technologies thereof.

What is claimed is:

1. A training method for an application mean opinion score (MOS) model, wherein the method comprises:
    sending, by a central network data analytics function (C-NWDAF) entity, a first subscription request to an edge network data analytics function (E-NWDAF) entity, wherein the first subscription request is used to subscribe to a quality of service MOS level of a target service and a corresponding first network performance indicator, and the first network performance indicator is a network performance indicator of a transmission network that carries the target service;

receiving, by the C-NWDAF entity, the quality of service MOS level and the first network performance indicator from the E-NWDAF entity;

establishing, by the C-NWDAF entity, a MOS model of the target service based on the quality of service MOS level and the first network performance indicator; and obtaining, by the C-NWDAF entity, a second network performance indicator corresponding to the MOS level and/or a first load of a first network function entity corresponding to the MOS level, wherein the second network performance indicator is a performance indicator of a radio network that carries the target service, and the first network function entity is a network data provider function entity;

wherein the establishing, by the C-NWDAF entity, a MOS model of the target service based on the quality of service MOS level and the first network performance indicator comprises:

excluding, by the C-NWDAF entity, a sample whose quality of service MOS is poor due to an exception of the terminal device and a sample whose quality of service MOS is poor due to an exception of the application function entity based on the quality of service MOS level, the first network performance indicator, and the second network performance indicator and/or the first load of the first network function entity; and establishing the MOS model of the target service.

2. The method according to claim 1, wherein the quality of service MOS level is determined based on service experience data of the target service.

3. The method according to claim 2, wherein when the target service is a video service, the service experience data comprises one or more of the following parameters:

an initial buffering delay, playback buffer duration, a bit rate, a service rate, a frame rate, smoothness, and a definition of the video service, and a resolution of a terminal device.

4. The method according to claim 1, wherein the obtaining, by the C-NWDAF entity, a first load of a first network function entity corresponding to the MOS level comprises:

sending, by the C-NWDAF entity, a second subscription request to a network repository function entity, wherein the second subscription request is used to subscribe to the first load of the first network function entity; and receiving, by the C-NWDAF entity, the first load of the first network function entity from the network repository function entity.

5. The method according to claim 1, wherein the obtaining, by the C-NWDAF entity, a second network performance indicator corresponding to the MOS level comprises:

sending, by the C-NWDAF entity, a second subscription request to an operation administration and maintenance (OAM) entity of a carrier network, wherein the second subscription request is used to subscribe to the second network performance indicator; and receiving, by the C-NWDAF entity, the second network performance indicator from the OAM entity.

6. The method according to claim 1, wherein before the sending, by a C-NWDAF entity, a first subscription request to an E-NWDAF entity, the method further comprises:

receiving, by the C-NWDAF entity, a second subscription request from a second network function entity, wherein the second subscription request is used to subscribe to the MOS model of the target service, and the second network function entity is a consumer function entity; and after the establishing, by the C-NWDAF entity, a MOS model of the target service, the method further comprises:

sending, by the C-NWDAF entity, the MOS model of the target service to the second network function entity.

7. The method according to claim 1, wherein the method further comprises:

receiving, by the C-NWDAF entity, a second subscription request from a policy control entity, wherein the second subscription request is used to request to provide service experience assurance for the target service of the target terminal device, and a quality of service MOS level requirement for the service experience assurance is a first quality of service MOS level;

sending, by the C-NWDAF entity, a third subscription request to the E-NWDAF entity, wherein the third subscription request is used to subscribe to a trigger event for using the target service by the target terminal device, a second quality of service MOS level of the target service, and a corresponding first network performance indicator;

after the trigger event is triggered, receiving, by the C-NWDAF entity, the second quality of service MOS level and the corresponding first network performance indicator from the E-NWDAF entity;

when the second quality of service MOS level is different from the first quality of service MOS level, matching, by the C-NWDAF entity, the first network performance indicator corresponding to the second quality of service MOS level with a first network performance indicator corresponding to the first quality of service MOS level in the MOS model of the target service, to obtain a network analysis result; and sending, by the C-NWDAF entity, the network analysis result to the policy control entity, wherein the network analysis result is used for network optimization.

8. The method according to claim 1, wherein the method further comprises:

receiving, by the C-NWDAF entity, a second subscription request from a policy control entity, wherein the second subscription request is used to request to provide service experience assurance for the target service of the target terminal device, and a quality of service MOS level requirement for the service experience assurance is a first quality of service MOS level;

determining, by the C-NWDAF entity based on a movement track of the target terminal device, that the target terminal device is to move from a service range of a first access network device to a movement range of a second access network device;

sending, by the C-NWDAF entity, a third subscription request to the E-NWDAF entity, wherein the third subscription request is used to subscribe to a trigger event for using the target service by a first terminal device and a first network performance indicator associated with the second access network device;

after the trigger event is triggered, receiving, by the C-NWDAF entity, the first network performance indicator associated with the second access network device from the E-NWDAF entity;

matching, by the C-NWDAF entity, the first network performance indicator associated with the second access network device with the MOS model of the target service, to determine a third quality of service MOS level of the target service corresponding to the first network performance indicator associated with the second access network device;

when the third quality of service MOS level is different from the first quality of service MOS level, matching, by the C-NWDAF entity, the first network performance indicator corresponding to the third quality of service MOS level with a first network performance indicator corresponding to the first quality of service MOS level in the MOS model of the target service, to obtain a network prediction result; and sending, by the C-NWDAF entity, the network prediction result to the policy control entity, wherein the network prediction result is used for network optimization.

9. A training method for an application mean opinion score (MOS) model, wherein the method comprises:

receiving, by an edge network data analytics function (E-NWDAF) entity, a first subscription request from a central network data analytics function (C-NWDAF) entity, wherein the first subscription request is used to subscribe to a quality of service MOS level of a target service and a corresponding first network performance indicator, and the first network performance indicator is a network performance indicator of a transmission network that carries the target service;

obtaining, by the E-NWDAF entity, the quality of service MOS level and the first network performance indicator; and sending, by the E-NWDAF entity, the quality of service MOS level and the first network performance indicator to the C-NWDAF entity;

receiving, by the E-NWDAF entity, a second subscription request from the C-NWDAF entity, wherein the second subscription request is used to subscribe to a trigger event for using the target service, a second quality of service MOS level of the target service, and a corresponding first network performance indicator;

after the trigger event is triggered, sending, by the E-NWDAF entity, the second quality of service MOS level and the corresponding first network performance indicator to the C-NWDAF entity;

wherein when the second quality of service MOS level is different from the first quality of service MOS level, the first network performance indicator corresponding to the second quality of service MOS level is matched with a first network performance indicator corresponding to the first quality of service MOS level in the MOS model of the target service, to obtain a network analysis result.

10. The method according to claim 9, wherein the obtaining, by the E-NWDAF entity, the quality of service MOS level comprises:

obtaining, by the E-NWDAF entity, service experience data of the target service; and determining, by the E-NWDAF entity, the quality of service MOS level based on the service experience data of the target service.

11. The method according to claim 10, wherein when the target service is a video service, the service experience data comprises one or more of the following parameters:

an initial buffering delay, playback buffer duration, a bit rate, a service rate, a frame rate, smoothness, and a definition of the video service, and a resolution of a terminal device.

12. A chip, comprising a processor and an interface port, wherein the processor is coupled to a memory through the interface port; and when the processor executes a computer programs or instructions stored in the memory, the method according to claim 1 is performed.

13. A chip, comprising a processor and an interface port, wherein the processor is coupled to a memory through the interface port; and when the processor executes a computer programs or instructions stored in the memory, the method according to claim 9 is performed.

* * * * *

UNITED STATES PATENT AND TRADEMARK OFFICE
CERTIFICATE OF CORRECTION

PATENT NO. : 12,113,679 B2
APPLICATION NO. : 17/581935
DATED : October 8, 2024
INVENTOR(S) : Shaofeng Kuai It is certified that error appears in the above-identified patent and that said Letters Patent is hereby corrected as shown below:

In the Claims

In Column 34, Line 2, in Claim 9, delete "entity:" and insert -- entity; --.

Signed and Sealed this
Tenth Day of December, 2024

Katherine Kelly Vidal
*Director of the United States Patent and Trademark Office*